US007339610B2

(12) United States Patent
Kusaka

(10) Patent No.: US 7,339,610 B2
(45) Date of Patent: Mar. 4, 2008

(54) IMAGE-CAPTURING DEVICE

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 614 days.

(21) Appl. No.: 09/995,656

(22) Filed: Nov. 29, 2001

(65) Prior Publication Data

US 2002/0093575 A1 Jul. 18, 2002

(30) Foreign Application Priority Data

Dec. 4, 2000 (JP) .............................. 2000-368865

(51) Int. Cl.
*H04N 5/225* (2006.01)
(52) U.S. Cl. ............................... 348/207.1; 348/207.11
(58) Field of Classification Search .. 348/231.1–231.9, 348/207.1, 233, 552, 207.11, 231.99, 211.99, 348/211.2, 211.3, 14.01–14
See application file for complete search history.

(56) References Cited

U.S. PATENT DOCUMENTS

| | | | | |
|---|---|---|---|---|
| 5,889,273 | A * | 3/1999 | Goto | 235/492 |
| 5,928,347 | A * | 7/1999 | Jones | 710/305 |
| 5,956,084 | A | 9/1999 | Moronaga et al. | 348/231.9 |
| 6,104,430 | A * | 8/2000 | Fukuoka | 348/231.6 |
| 6,204,877 | B1* | 3/2001 | Kiyokawa | 348/211.3 |
| 6,297,870 | B1* | 10/2001 | Nanba | 355/18 |
| 6,538,692 | B2* | 3/2003 | Niwa | 348/231.1 |
| 6,628,325 | B1* | 9/2003 | Steinberg et al. | 348/211.1 |
| 6,628,899 | B1* | 9/2003 | Kito | 396/56 |
| 6,773,953 | B1* | 8/2004 | Gaylord | 438/57 |
| 6,788,332 | B1* | 9/2004 | Cook | 348/14.02 |
| 6,833,861 | B2* | 12/2004 | Matsumoto et al. | 348/207.2 |
| 6,900,912 | B1* | 5/2005 | Miyake | 358/474 |
| 7,062,230 | B1* | 6/2006 | Ishiguro et al. | 455/91 |

FOREIGN PATENT DOCUMENTS

| | | |
|---|---|---|
| EP | 0 485 149 A2 | 5/1992 |
| JP | A 5-56322 | 3/1993 |
| JP | A 5-276472 | 10/1993 |
| JP | A 6-339099 | 12/1994 |
| JP | 937125 * | 7/1995 |
| JP | A 7-212707 | 8/1995 |
| JP | A 9-83930 | 3/1997 |
| JP | A 10-336572 | 12/1998 |

* cited by examiner

*Primary Examiner*—Lin Ye
*Assistant Examiner*—Yogesh Aggarwal
(74) *Attorney, Agent, or Firm*—Oliff & Berridge, PLC

(57) ABSTRACT

An image-capturing device according to the present invention includes: an image sensor that captures a subject image and generates image data; a buffer memory that temporarily stores the image data; a connection unit that electrically and detachably connects a portable memory to a main body; a wireless communication circuit capable of wirelessly communicating with an external device; and an image storage control unit that stores the image data temporarily stored at the buffer memory into the portable memory connected at the connection unit and transfers the image data temporarily stored at the buffer memory to the external device via the wireless communication circuit if the portable memory is substantially unusable.

17 Claims, 14 Drawing Sheets

IMAGE-CAPTURING DEVICE

INCORPORATION BY REFERENCE

The disclosure of the following priority application is herein incorporated by reference: Japanese Patent Application No. 2000-368865 filed Dec. 12th, 2000

BACKGROUND OF THE INVENTION

1. Field of the Invention

The present invention relates to an image-capturing device such as an electronic camera that records an image captured by employing an image sensor, and more specifically, it relates to an image-capturing device that records image data into a recording medium such as a memory card that can be detachably mounted at the main body of the image-capturing device.

2. Description of the Related Art

There are electronic cameras that store image data obtained through a photographing operation into a portable memory such as a memory card loaded in a slot in the related art. In such a camera, image data obtained from a photographing operation can not be stored if the storage capacity of the portable memory has become low or if no portable memory is loaded. As a means for solving this problem, Japanese Laid-Open Patent Publication No. H 5-56322 and Japanese Laid-Open Patent Publication No. H 10-336572 each disclose an electronic camera that temporarily stores photographic image data into an internal memory within the electronic camera if the recording capacity of the portable memory loaded in the slot is not sufficient or if no portable memory is loaded in the slot.

In addition, there is an electronic camera in the known art having a wireless communication circuit, which transfers photographic image data to an external device through a wireless line to store the image data in an external memory connected to the external device.

However, there is a problem with the electronic camera that temporarily stores photographic image data into the internal memory if the portable memory, which must be loaded in the main body for use, is not available, in that since the storage capacity of the internal memory is smaller than the storage capacity of the portable memory and thus there is a limit to the volume of image data that can be stored in the internal memory, the number of photographs that can be taken after the portable memory becomes unavailable is also limited. Since it is not very likely that the photographer has a spare portable memory for image data storage such as a memory card, which is more expensive than silver halide film and the like and also, the availability of such portable memory products is relatively limited, it is expected to take the photographer a considerable length of time to acquire a new portable memory and utilize it in the electronic camera, and thus, the problem of the limited number of photographs that can be taken described above can become a serious concern.

While it is conceivable to employ a memory with a large storage capacity for the internal memory, the cost of nonvolatile memory with a large storage capacity (such as flash memory) is much higher than the cost of volatile memory and, for this reason it cannot be readily used in an electronic camera which is a commercial product.

In the electronic camera that transfers photographic image data to an external device through a wireless line, on the other hand, the transmission of the photographic image data is disabled and the subsequent photographing operation is also disabled if communication with the external device becomes disabled, and thus, there are concerns that the photographic image data cannot be used and that the photographer may miss good photo opportunities.

SUMMARY OF THE INVENTION

An object of the present invention is to provide an image-capturing device such as an electronic camera that stores into a portable memory such as a memory card loaded in the slot and is capable of performing a photographing operation promptly with a high degree of reliability even when the portable memory is not available.

Another object of the present invention is to provide an image-capturing device such as an electronic camera that transfers a captured image to an external device through a wireless line and is capable of performing a photographing operation with a high degree of reliability even when communication with the external device is disabled.

In order to attain the above object, an image-capturing device according to the present invention comprises: an image sensor that captures a subject image and generates image data; a buffer memory that temporarily stores the image data; a connection unit that electrically and detachably connects a portable memory to a main body; a wireless communication circuit capable of wirelessly communicating with an external device; and an image storage control unit that stores the image data temporarily stored at the buffer memory into the portable memory connected at the connection unit and transfers the image data temporarily stored at the buffer memory to the external device via the wireless communication circuit if the portable memory is substantially unusable.

In this image-capturing device, it is preferred that: the portable memory is a memory card; and the connection unit is a memory card slot at which a memory card is detachably loaded.

Also, it is preferred that a connection detection unit that detects whether or not the portable memory is connected at the connection unit is further provided, and the image storage control unit transfers the image data temporarily stored at the buffer memory to the external device via the wireless communication circuit if the connection detection circuit detects that the portable memory is not connected at the connection unit.

Also, it is preferred that the image storage control unit detects whether or not a storage capacity of the portable memory connected at the connection unit is insufficient and transfers the image data temporarily stored at the buffer memory to the external device via the wireless communication circuit if the storage capacity of the portable memory connected at the connection unit is detected to be insufficient.

Also, it is preferred that a nonvolatile internal memory is further provided, and the image storage control unit stores in the internal memory image identification information used to identify the image data and transmission recipient information used to identify the external device to which the image data are to be transmitted, when transferring the image data temporarily stored at the buffer memory to the external device via the wireless communication circuit. In this case, it is preferred that: the image storage control unit transfers the image data temporarily stored at the buffer memory to the external device via the wireless communication circuit to store the image data temporarily stored at the buffer memory into the external device if the portable memory is substantially unusable; and when a substantially usable portable memory is detected to be connected at the connection unit after the image data are transferred, the image storage control unit receives the transferred image data via the wireless communication circuit from the external device to which the image data have been transmitted based upon the image identification information and the transmission recipient information stored in the internal memory and stores the image data thus received into the portable memory. Or, it is preferred that the image storage control unit stores thumbnail image data of the image data transferred to the external device into the internal memory.

Another image-capturing device according to the present invention comprises: an image sensor that captures a subject image and generates image data; a buffer memory that temporarily stores the image data; a connection unit that electrically and detachably connects a portable memory to a main body; a wireless communication circuit capable of communicating with an external device through a wireless line; and an image storage control unit that transfers the image data temporarily stored at the buffer memory to the external device via the wireless communication circuit to store the image data temporarily stored at the buffer memory to the external device and stores the image data temporarily stored at the buffer memory into the portable memory connected at the connection unit if the external device is substantially unusable.

In this image-capturing device, it is preferred that: the portable memory is a memory card; and the connection unit is a memory card slot at which a memory card is detachably loaded.

Also, it is preferred that the image storage control unit detects whether or not wireless communication with the external device is enabled and stores the image data temporarily stored at the buffer memory into the portable memory connected at the connection unit if wireless communication with the external device is detected to be disabled.

Also, it is preferred that the image storage control unit detects whether or not a storage capacity of the external device is sufficient and stores the image data temporarily stored at the buffer memory into the portable memory connected at the connection unit if the storage capacity of the external device is detected to be insufficient.

Another image-capturing device according to the present invention comprises: an image sensor that captures a subject image and generates image data; a connection unit that electrically and detachably connects a portable memory to a main body; a wireless communication circuit capable of communicating with an external device through a wireless line; and an image storage control unit that stores the image data into the portable memory if the portable memory is connected at the connection unit and transfers the image data to the external device via the wireless communication circuit if the portable memory is not connected at the connection unit.

Another image-capturing device according to the present invention comprises: an image sensor that captures a subject image and generates image data; a connection unit that electrically and detachably connects either a portable memory or a wireless communication circuit capable of wirelessly communicating with an external device to a main body; and an image storage control unit that stores the image data into the portable memory if the portable memory is connected at the connection unit and transfers the image data to the external device via the wireless communication circuit if the wireless communication circuit is connected at the connection unit.

It is preferred that the above image-capturing devices are electronic cameras.

DESCRIPTION OF THE PREFERRED EMBODIMENTS

Figure 1:
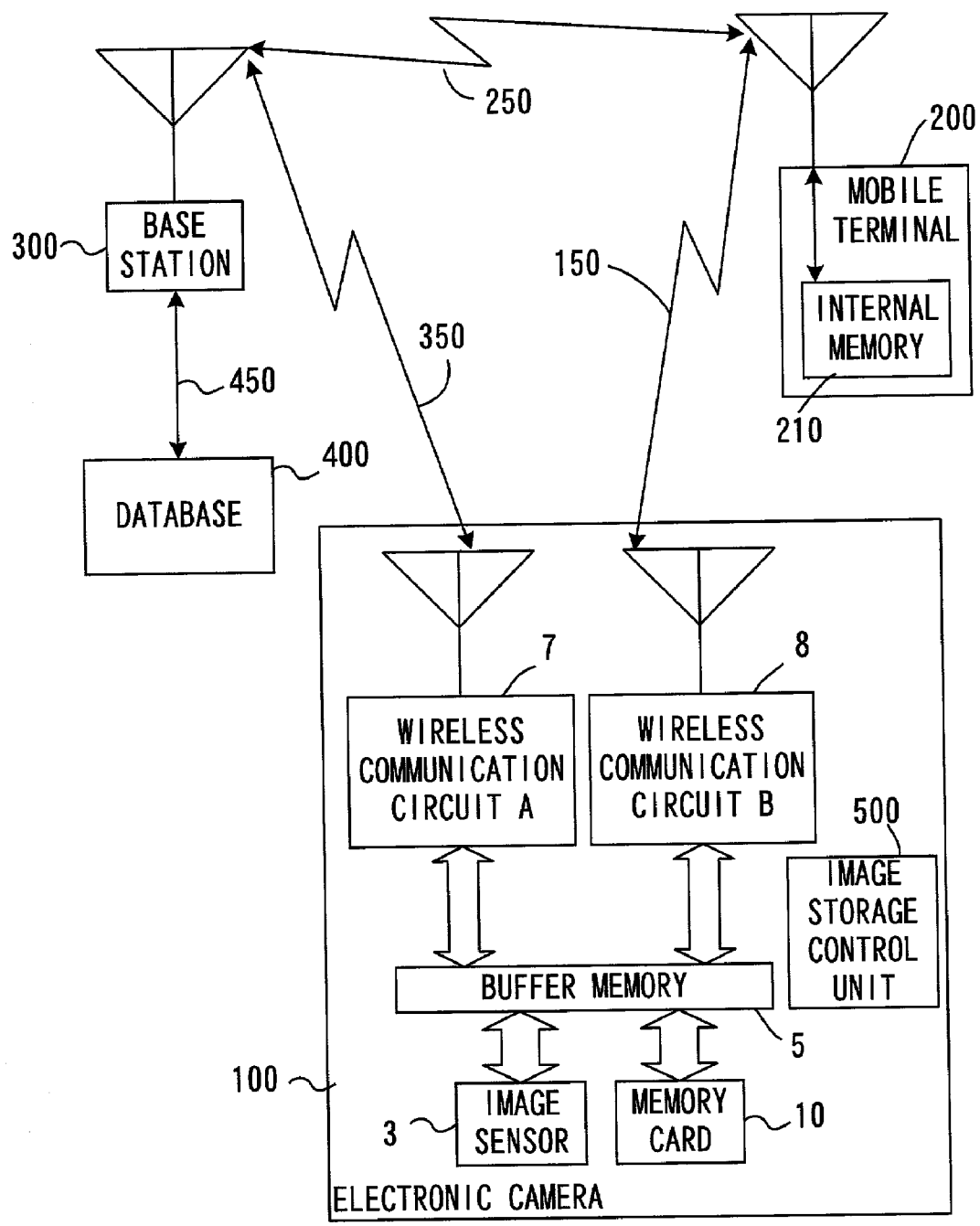
FIG. 1 is a block diagram of the structure assumed in an embodiment of the present invention.

The following is an explanation of an embodiment of the present invention, given in reference to the drawings. FIG. 1 is a block diagram illustrating the concept of the electronic camera according to the present invention. In an electronic camera 100 shown in FIG. 1, which comprises an image sensor 3, a buffer memory 5, a wireless communication circuit A7, a wireless communication circuit B8 and an image storage control unit 500, a memory card 10 constituting a portable memory for image data storage can be detachably loaded at the main body. Image data obtained through an image-capturing operation performed at the image sensor 3 are first stored in the buffer memory 5. The image sensor 3 is constituted of an image-capturing element such as a CCD.

The wireless communication circuit A7, which is utilized for long-distance communication, is capable of exchanging various types of information including image data with a database 400 connected to a base station 300 through a wired or wireless communication line 450 by engaging in communication with the base station 300 through a high output radio wave via a wireless communication line 350. The wireless communication line 350 may be, for instance, a wireless line (public telephone line) used for mobile telephone communication.

The wireless communication circuit B8, which is utilized for short-distance communication, is capable of exchanging various types of information including image data with an internal memory 210 of a mobile terminal 200 or the like present within a short distance by engaging in communication with the mobile terminal 200 through a radio wave with a relatively small output via a wireless line 150 and is also capable of exchanging various types of information including image data with the database 400 connected to the base station 300 through the wired or wireless communication line 450 by engaging in communication with the remote base station 300 via the mobile terminal 200 and also a wireless line 250. The wireless communication line 150 may conform to the "Blue tooth" specifications that constitute the short distance wireless interface standard proposed by, for instance, Erickson and IBM. The "Blue tooth" specifications enable wireless communication between devices distanced from each other over up to approximately 10 m. In addition, the wireless communication line 250 may be the wireless line for mobile telephone communication mentioned earlier.

The image storage control unit 500 implements control to designate which storage medium among the memory card 10 loaded in the electronic camera 100, the internal memory 210 at the mobile terminal 200 and the database 400 into which the image data temporarily stored at the buffer memory 5 are to be stored, depending upon the situation.

While the image storage control unit 500 stores image data obtained through an image-capturing operation into the loaded memory card via the buffer memory 5 in the structure described above, the image data stored at the buffer memory 5 are transmitted to the mobile terminal 200 via the wireless communication circuit B8 and are then stored in the internal memory 210 at the mobile terminal 200 if the loaded memory card 10 is substantially unusable (if the storage capacity is not sufficient or the memory card 10 is not loaded). Or image data temporarily stored in the internal memory 210 at the mobile terminal 200 are transmitted from the mobile terminal 200 to the base station 300 to be stored at the database 400 connected to the base station 300. Or, the image storage control unit 500 may engage in direct communication with the base station 300 to store the image data at the database 400 connected to the base station 300.

In addition, if the memory card 10 becomes available for use subsequently (if a memory card 10 with sufficient storage capacity is loaded), the image data stored in the internal memory 210 at the mobile terminal 200 are stored into the loaded memory card 10 through communication with the mobile terminal 200. In another case, the image storage control unit 500 engages in communication either directly or via the mobile terminal 200, receives the image data stored at the database 400 connected to the base station 300 and stores the received image data into the loaded memory card 10.

As described above, the image storage control unit 500 assumes a structure and an operation through which photographic image data are wirelessly transferred to an external device such as the mobile terminal 200 or the base station 300 if the memory card 10 is substantially unusable for use and the transferred image data are further transmitted to a recipient external memory connected to the external device such as the internal memory 210 internally provided at the mobile terminal 200 or the database 400 connected to the base station 300, thereby allowing the user to perform a photographing operation without worrying about the limited number of photographs that can be taken. In addition, since the transmission to the external device is enabled at all times through wireless communication, the photographer who does not need to connect a communication cord each time can take photographs without missing a good photo opportunity.

When a new memory card 10 is loaded, image data having been obtained through a photographing operation and having been transferred while the memory card 10 was not available for use are automatically retrieved to the electronic camera 100 from the external device to which the image data have been transmitted and are stored in the newly loaded memory card 10 and, as a result, the photographer himself is not required to perform a complicated operation for retrieving the transmitted image data (such as setting a communication partner) and thus, he can focus on photo opportunities that may arise.

In a system in which the image storage control unit 500 normally transmits image data obtained through an image-capturing operation to an external device such as the mobile terminal 200 or the base station 300 via a wireless communication line and stores the image data into an external memory connected to the external device (the internal memory 210 at the mobile terminal 200, the database 400 or the like), on the other hand, the memory data stored in the buffer memory 5 are first transferred and saved into the memory card 10 if the external memory is substantially unusable for use (disabled communication with the external device or insufficient capacity at the external memory).

If the communication with the mobile terminal 200, the base station 300 or the like is established subsequently and it is verified that the external memory is now available for use, the image data stored in the memory card 10 are stored into the internal memory 210 at the mobile terminal 200 through communication with the mobile terminal 200. Alternatively, the image data stored in the memory card 10 are stored into the database 400 connected to the base station 300 through communication with the base station 300 which is implemented either directly or via the mobile terminal 200.

Since the structure and the operation through which the photographic image data are first stored into the memory card 10 loaded at the electronic camera 100 if the external memory is substantially unusable for use are assumed in the electronic camera 100 as described above, it becomes possible to use a memory card with a larger storage capacity than in an electronic camera having an image memory for temporary storage internally provided at the main body of the electronic camera and, furthermore, since the memory card 10 itself can be replaced with no problem, the photographer is able to engage in a photographing operation without worrying about the limits to the number of photographs that can be taken.

In addition, when the external memory becomes substantially available for use, the image data having been obtained through a photographing operation and having been stored at the memory card 10 while the external memory has been unavailable for use are automatically read out from the memory card 10 in the electronic camera 100 and are transferred to the external device to be stored into the external memory provided on the external device side and, as a result, the photographer himself is not required to perform a complicated operation for transferring the image data (such as setting a communication partner) and thus is allowed to focus on good photo opportunities that may arise. It is to be noted that since a state in which external memory is not usable (disabled communication or the like) is likely to be cleared sooner than a state in which the user has run out of available space on a spare memory card 10, the photographer should be able to deal with the contingency of the external memory becoming unavailable by having a few memory cards on hand at all times.

Figure 2:
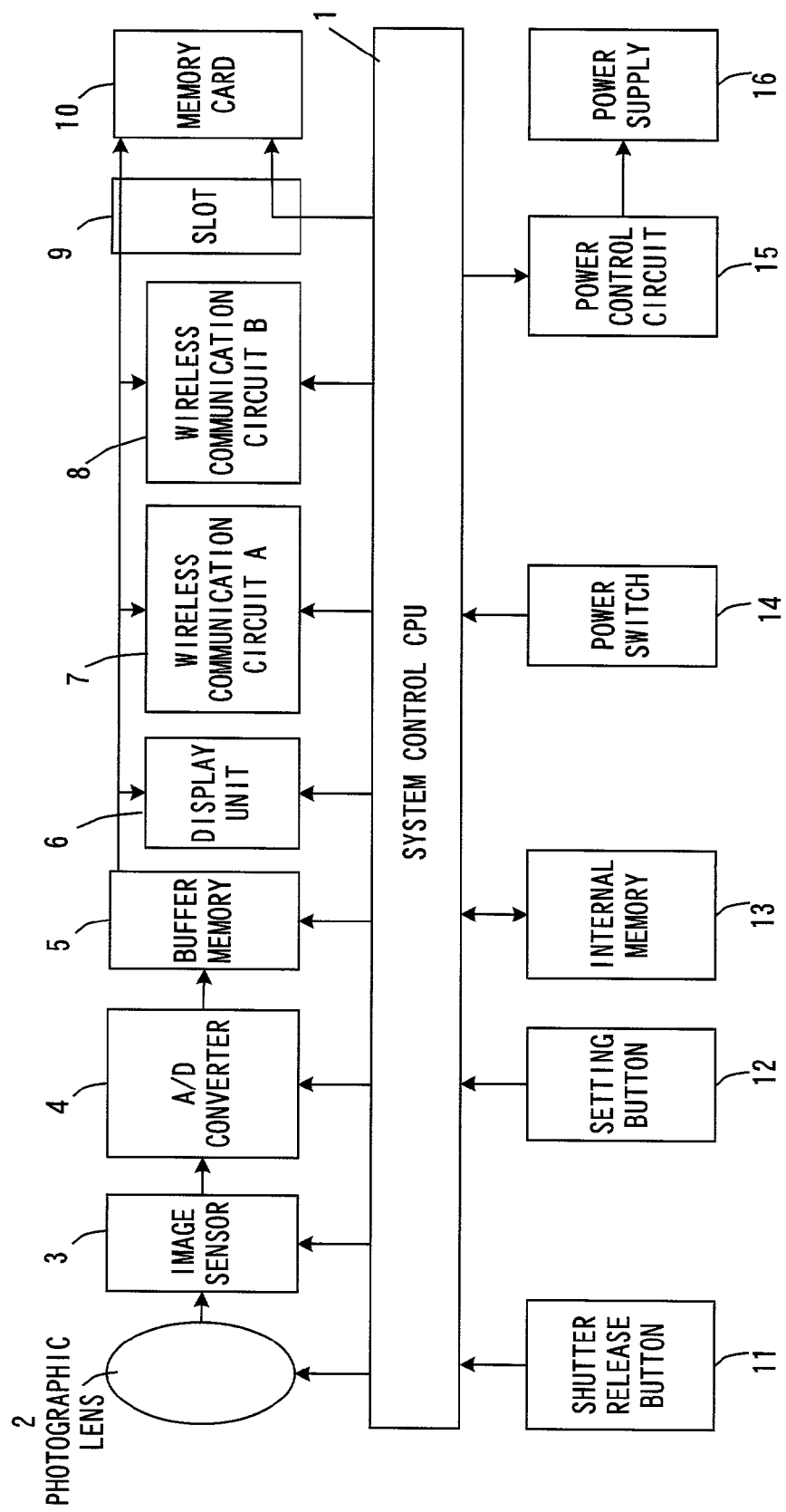
FIG. 2 is a block diagram showing in detail the structure assumed in an electronic camera adopting the present invention.

FIG. 2 presents a block diagram showing the structure of the electronic camera in FIG. 1 in greater detail. A system control CPU 1, which is a means of constituting the image storage control unit characterizing the present invention, controls the overall operation of the electronic camera and also implements control with regard to which storage medium image data obtained through an image-capturing operation should be saved into. A subject image formed through a photographic lens 2 undergoes a photoelectric conversion at the image sensor 3 and, as a result, an image signal is output.

The image signal is converted to digital image data at a means for A/D conversion 4 and the digital image data are temporarily stored at the volatile buffer memory 5 which may be a DRAM. The image constituted of the image data stored at the buffer memory 5 is displayed at a display unit 6 constituted of a liquid crystal or the like. The wireless communication circuit A7 and the wireless communication circuit B8 each transmit various types of information (the image data stored at the buffer memory 5 and the like) from the electronic camera to an external device and receive various types of information (such as image data) from the external device to the electronic camera by engaging in wireless communication with the external device provided outside the electronic camera. A slot 9 is a loading unit where the memory card 10 is loaded. The memory card 10 is a recording medium into which image data and the like stored at the buffer memory 5 are recorded and saved when the memory card 10 is loaded at the slot 9. The system control CPU (means for central processing control) 1 implements control on the image capturing operation, the storage operation, the display operation and the recording operation described above.

A shutter release button 11, which is a member operated by the photographer during a photographing operation, generates a shutter release signal in response to the user operation. A setting button 12 is a member operated by the photographer and the photographer manually selects various operation settings for the electronic camera through this button. An internal memory 13, which is a memory constituted of a nonvolatile memory such as an EEPROM or a flash memory, is capable of continuously storing information on the electronic camera operation even while the power is off. A power switch 14, which is a member operated by the photographer, generates a power switch signal in response to the user operation. The system control CPU 1 turns on/off a power supply 16 for the entire electronic camera system through a power control circuit 15 based upon the power switch signal.

In the structure described above, the system control CPU 1 controls the power supply 16 through the power control circuit 15 to turn on the power to the entire electronic camera system when the power switch 14 is turned on. The photographer loads a memory card at the slot 9 and he also operates the setting button 12 to set necessary information in the electronic camera. For instance, the photographer is allowed to set a storage mode for the electronic camera, i.e., whether image data obtained through an image-capturing operation are to be stored into the loaded memory card 10 (card mode) or they are to be stored into an external memory connected to the external device through wireless communication (communication mode), to set an image reception mode (an operation mode in which image data temporarily stored in the external memory connected to the external device are recalled and stored into the memory card) or an image transmission mode (an operation mode in which image data temporarily stored in the memory card are recalled, wirelessly transmitted to the external device and stored into the external memory connected to the external device), both of which are to be detailed later, and to select an image by viewing thumbnail images.

The subject image formed at the photographic lens 2 is captured by the image sensor 3 which then generates an image signal, and the image signal is converted to digital image data by an A/D converter 4. The digitized image data are temporarily stored in the buffer memory 5 and also are displayed at the display unit 6. Before a shutter release signal is generated at the shutter release button 11, the image-capturing operation, the A/D conversion, the image storage and image display described above are executed repeatedly.

Once a shutter release signal is generated through the shutter release button 11, an image-capturing operation, an A/D conversion, an image storage operation and an image display operation are executed in response, and the image data temporarily stored in the buffer memory 5 are transferred from the buffer memory 5 to a recipient corresponding to the storage mode setting (the card mode or the communication mode), i.e., the image data are transferred from the buffer memory 5 to the memory card 10 loaded at the slot 9 in the card mode, or the image data stored in the buffer memory 5 are transferred to an external device by the wireless communication circuit A7 or the wireless communication circuit B8 in the communication mode.

It is to be noted that if the memory card 10 is not loaded at the slot 9 or the storage capacity of the loaded memory card 10 is not sufficient while the card mode is selected, the image data stored in the buffer memory 5 are transferred to an external device by the wireless communication circuit A7 or the wireless communication circuit B8 to be temporarily stored in the external memory connected to the external device.

If a memory card 10 with ample storage capacity is loaded at the slot 9 subsequently, the image data stored in the external memory on a temporary basis are read out into the buffer memory 5 via the external device by the wireless communication circuit A7 or the wireless communication circuit B8 and the image data are then transferred into the memory card 10 loaded at the slot 9 from the buffer memory 5.

In addition, if communication with the external device is disabled or the external memory connected to the external device is insufficient while the communication mode is selected, the image data are transferred and temporarily stored into the memory card 10 loaded at the slot 9 from the buffer memory 5.

If the communication with the external device is restored and thus it becomes possible to store the image data into the external memory connected to the external device subsequently, the image data are read out from the memory card 10 loaded at the slot 9 into the buffer memory 5, the image data stored in the buffer memory 5 are transferred to the external device by the wireless communication circuit A7 or the wireless communication circuit B8 and the image data are stored into the external memory connected to the external device.

When the power switch 14 is turned off, the system control CPU 1 implements control on the power supply 16 via the power control circuit 15 at a point in time at which the operational sequence described above is completed, to turn off the power to the entire electronic camera system.

Figure 3:
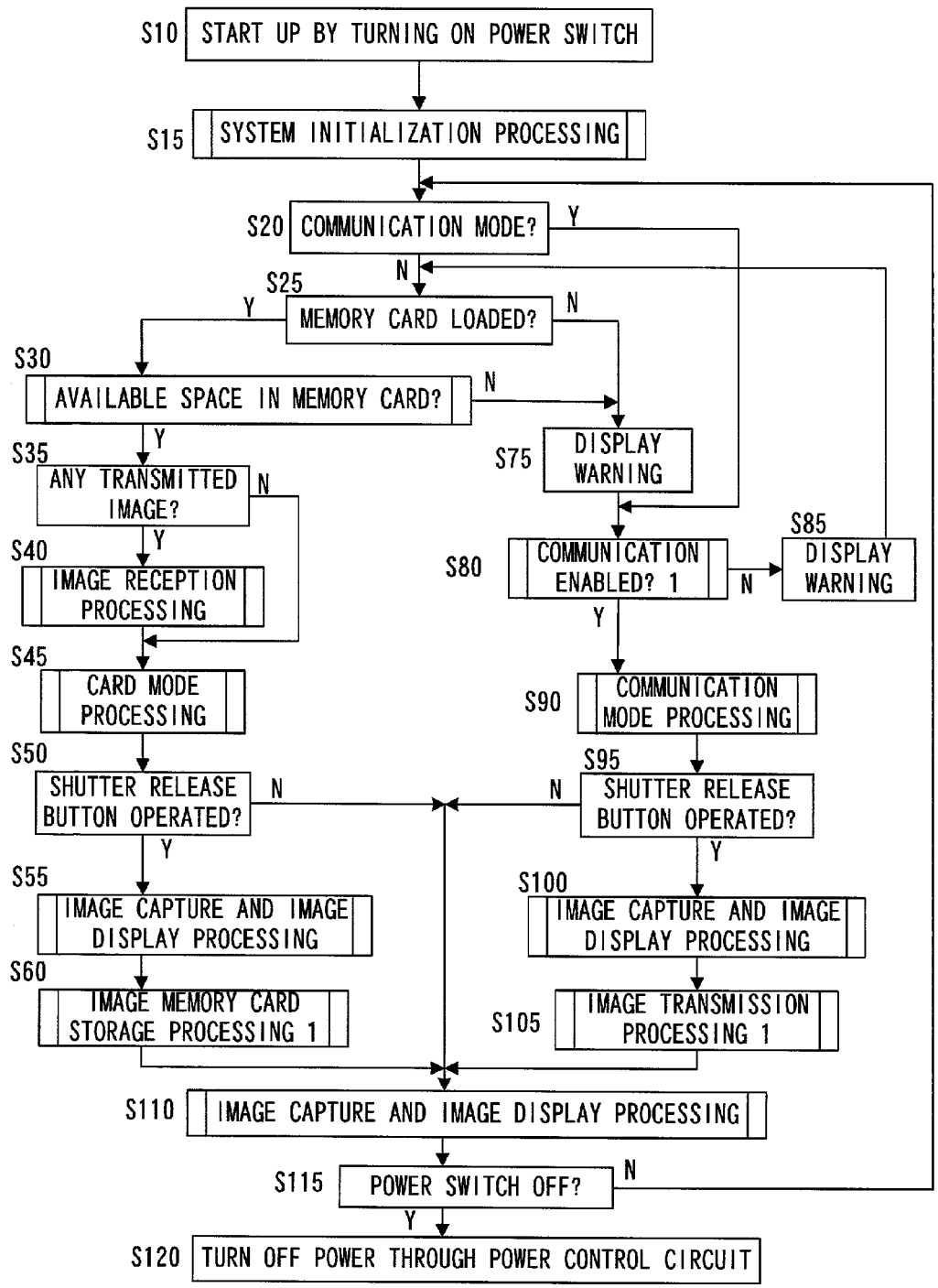
FIG. 3 presents a flowchart of the main operation processing.
Figure 14:
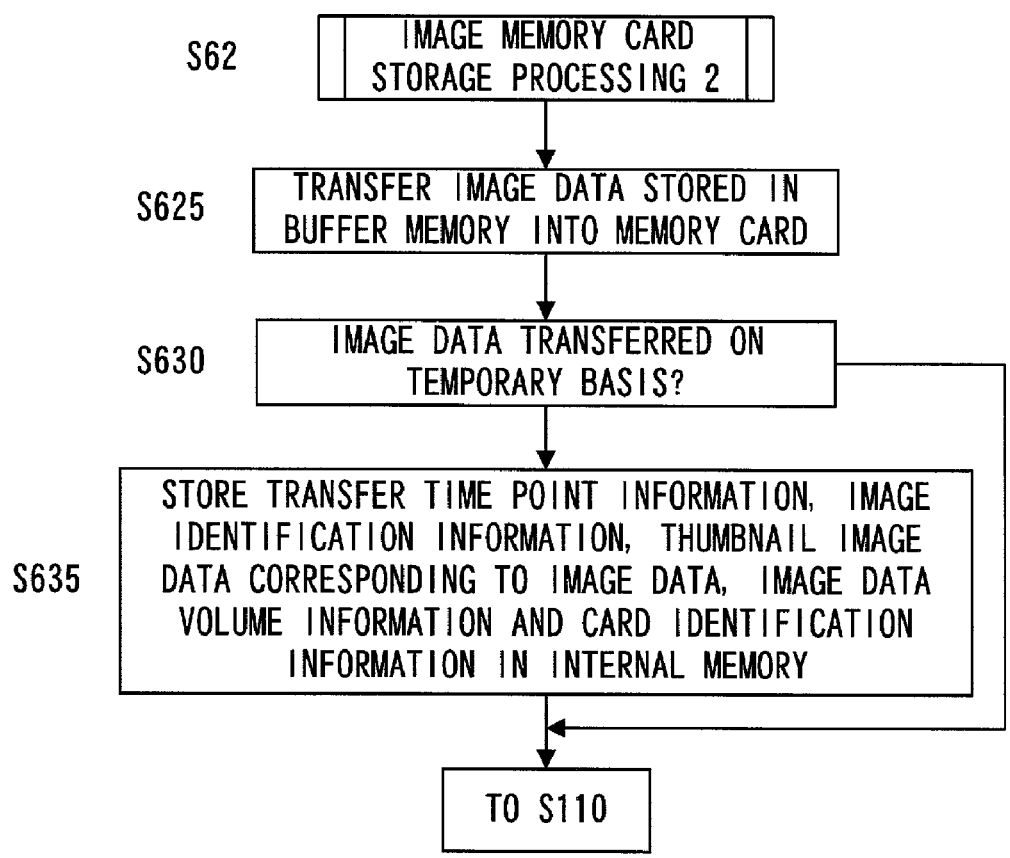
FIG. 14 presents a flowchart of the image memory card storage processing 2.

FIG. 3 shows the main program executed by the system control CPU 1. The operation of the system control CPU 1 starts from S10 in FIG. 3 as the power switch is turned on. In S15, the electronic camera system initialization processing in FIG. 14 is executed. In S20, the current storage mode setting is checked to determine whether or not the communication mode is currently selected, and if it is ascertained that the communication mode is selected, the operation proceeds to S80, whereas if it is ascertained that the card mode is currently selected, the operation proceeds to S25. In S25, a decision is made as to whether or not a memory card is loaded at the slot, and if a memory card is loaded, the operation proceeds to S30, whereas if no memory card is loaded, the operation proceeds to S75. The presence/absence of a memory card may be detected through a mechanical switch or it may be electrically detected through communication or the like with the memory card.

Figure 5:
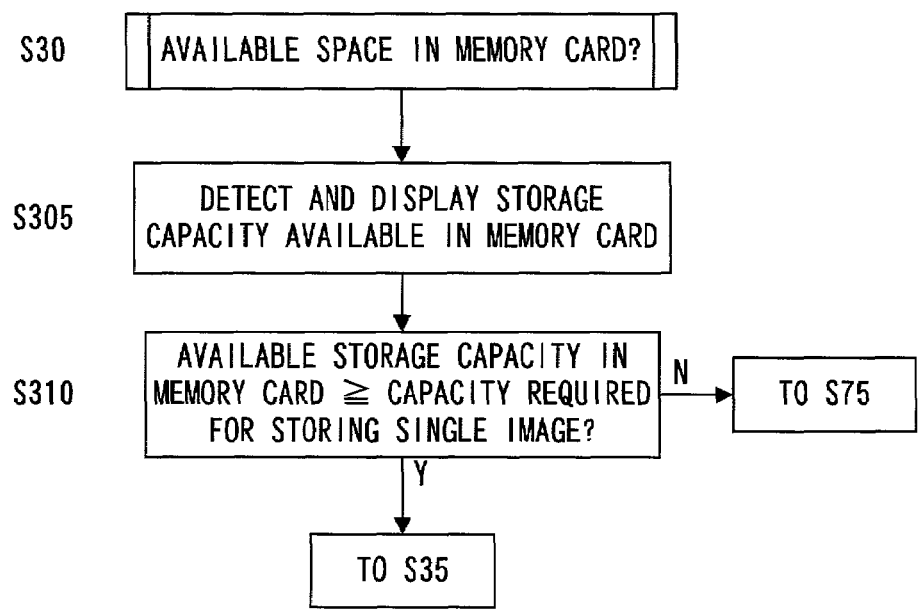
FIG. 5 presents a flowchart of the check processing implemented to check the memory card available storage capacity.
Figure 6:
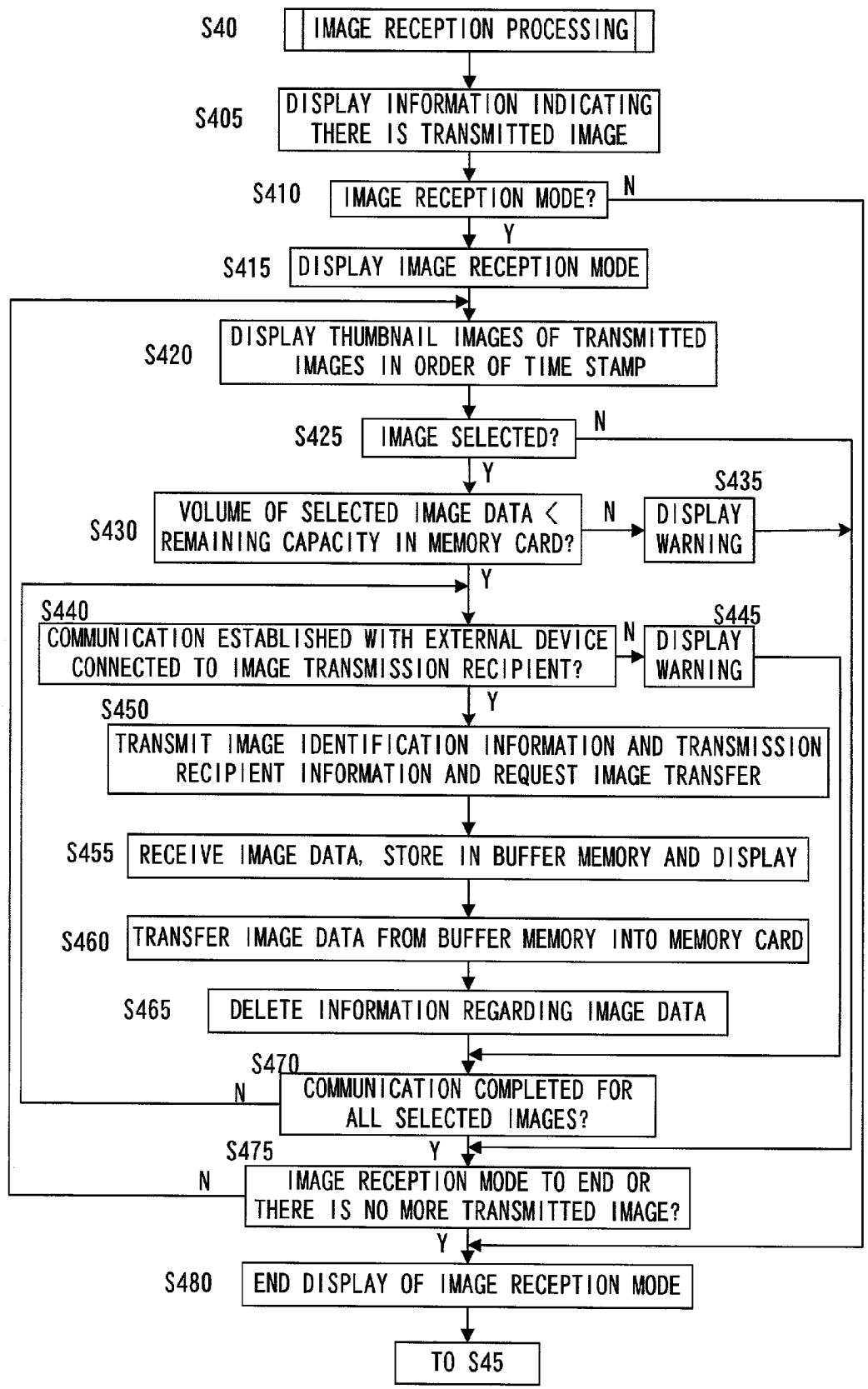
FIG. 6 presents a flowchart of the image reception processing.
Figure 7:
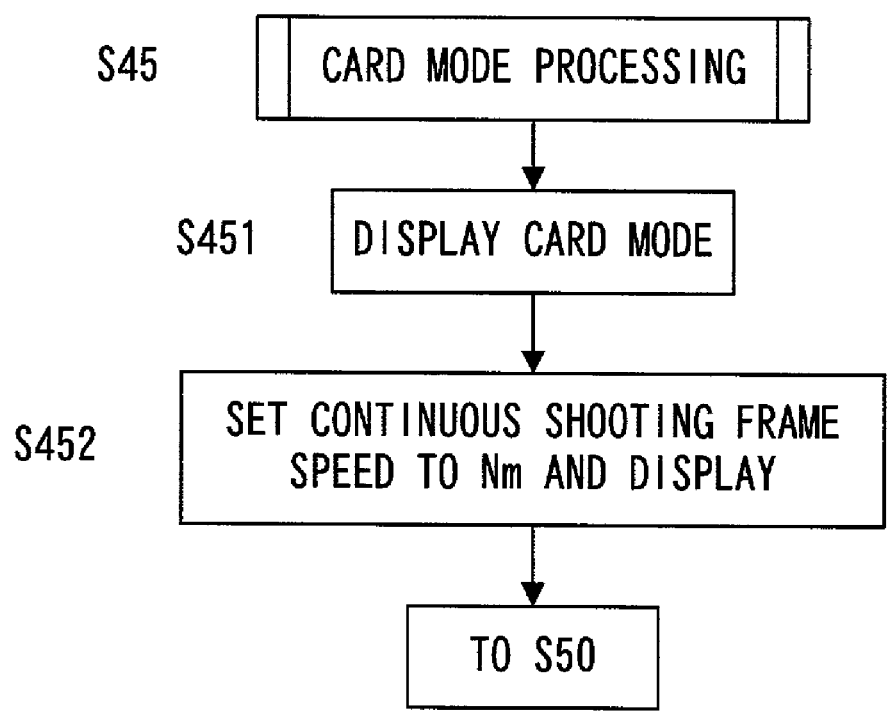
FIG. 7 presents a flowchart of the card mode processing.

In S30, the available storage capacity remaining at the memory card is checked as shown in FIG. 5, and if it is decided that there is sufficient storage capacity remaining at the memory card, the operation proceeds to S35, whereas if it is decided that there is not sufficient storage capacity, the operation proceeds to S75. In S35, a decision is made as to whether or not there is an image having been transmitted on a temporary basis to the external memory through wireless communication, and if it is decided that there is such an image, the operation proceeds to S40, whereas if it is decided that there is no such image, the operation proceeds to S45. It is to be noted that the decision as to whether or not there is an image having been wirelessly transmitted to the external memory on a temporary basis can be made by checking whether or not the internal memory holds information on any image data having been transferred to the external device. In S40, the image reception processing in FIG. 6 is executed to wirelessly receive the image data having been wirelessly transmitted and stored into the external memory on a temporary basis into the electronic camera to store the received image data into the buffer memory and then store the image data stored in the buffer memory into the memory card loaded at the slot, before the operation proceeds to S45. In S45, the card mode processing shown in FIG. 7 is executed to indicate that the card mode has been selected and to set a continuous shooting mode for the electronic camera, before the operation proceeds to S50.

Figure 8:
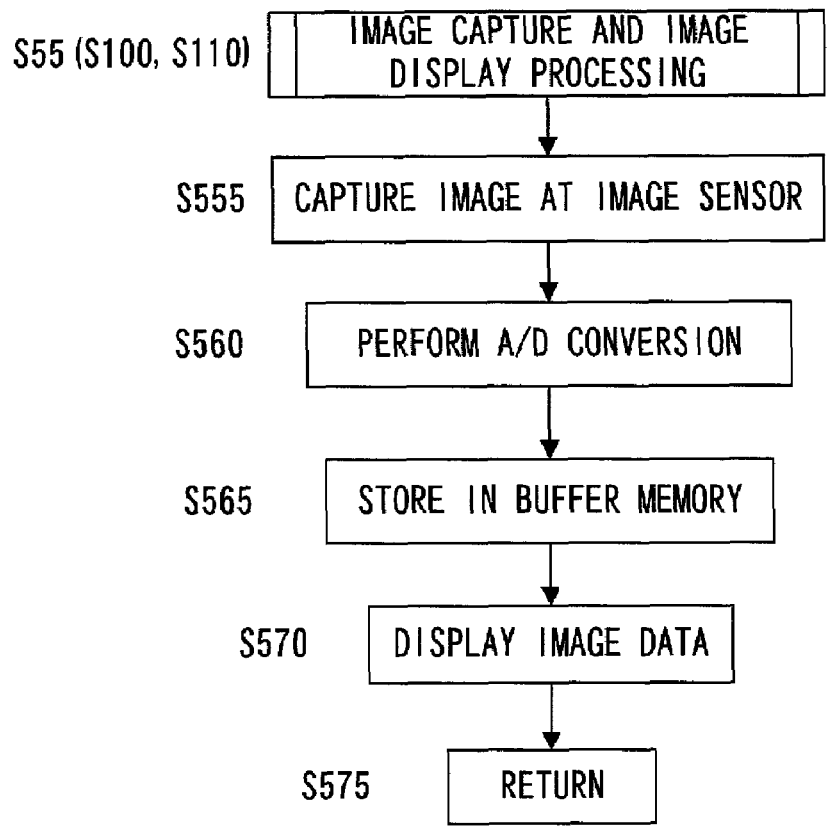
FIG. 8 presents a flowchart of the image capturing and image display processing.
Figure 9:
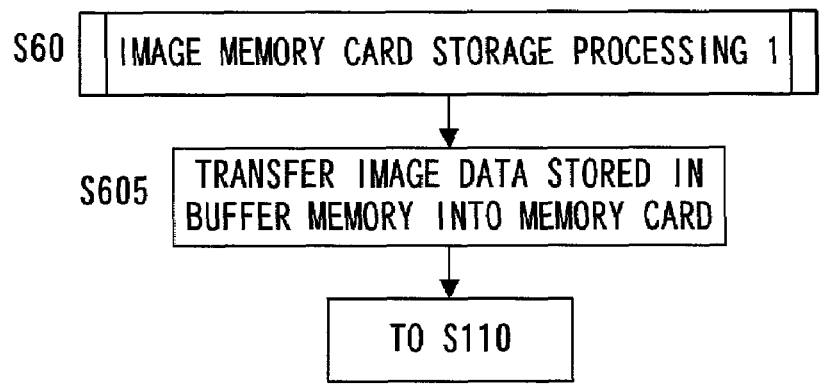
FIG. 9 presents a flowchart of the image memory card storage processing 1.

In S50, a decision is made as to whether or not a shutter release instruction has been issued through an operation of the shutter release button, and the operation proceeds to S55 if a shutter release instruction has been issued, whereas the operation proceeds to S110 if a shutter release instruction has not been issued. In S55, the image capture and image display processing shown in FIG. 8 is executed to perform an image-capturing operation at the image sensor, an A/D conversion operation on the image signal at the A/D converter, a storage operation for storing the image data into the buffer memory and a display operation for displaying the image data at the display unit, before the operation proceeds to S60. In S60, the image memory card storage processing 1 shown in FIG. 9 is executed to store the image data stored at the buffer memory into the memory card loaded at the slot, before the operation proceeds to S110.

Figure 10:
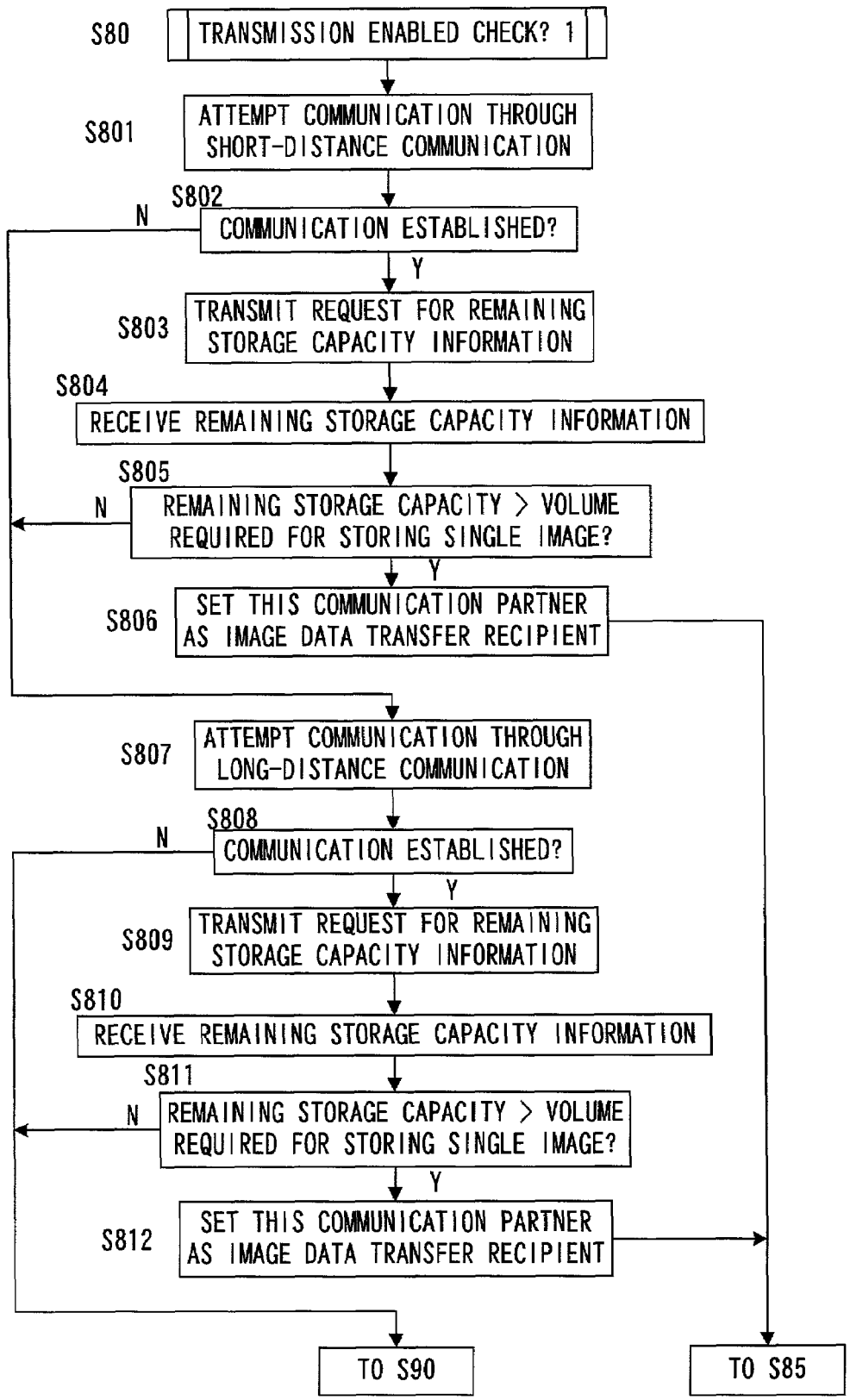
FIG. 10 presents a flowchart of the communication enabled check processing 1.

In S75, a warning indicating that no memory card is loaded at the slot or that the storage capacity remaining at the loaded memory card is not sufficient, although the card mode is selected, is displayed at the display unit, before the operation proceeds to S80. The warning thus displayed prompts the photographer to take appropriate action such as loading a new memory card thereby preventing erroneous handling of the image data. In S80, the communication enabled check processing 1 shown in FIG. 10 is executed to make a decision as to whether or not wireless communication with the external device is enabled, and if the communication is enabled, the operation proceeds to S90, whereas if the communication is disabled, the operation proceeds to S85. In S85, a message indicating that communication with the external device is disabled is displayed at the display unit, before the operation returns to step S25. The warning thus displayed prompts the photographer to take appropriate action such as selecting the card mode for the storage mode, thereby preventing erroneous handling of the image data.

Figure 11:
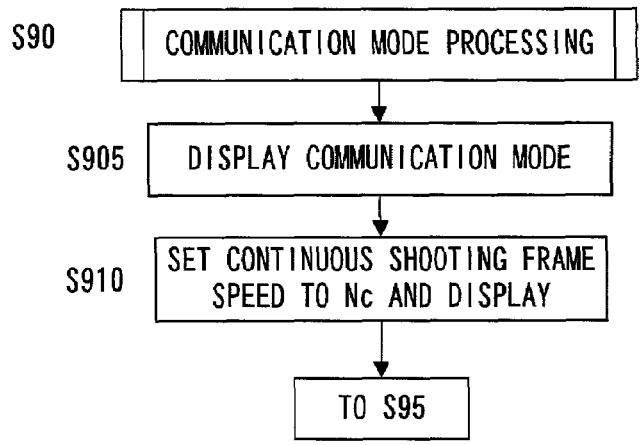
FIG. 11 presents a flowchart of the communication mode processing.
Figure 12:
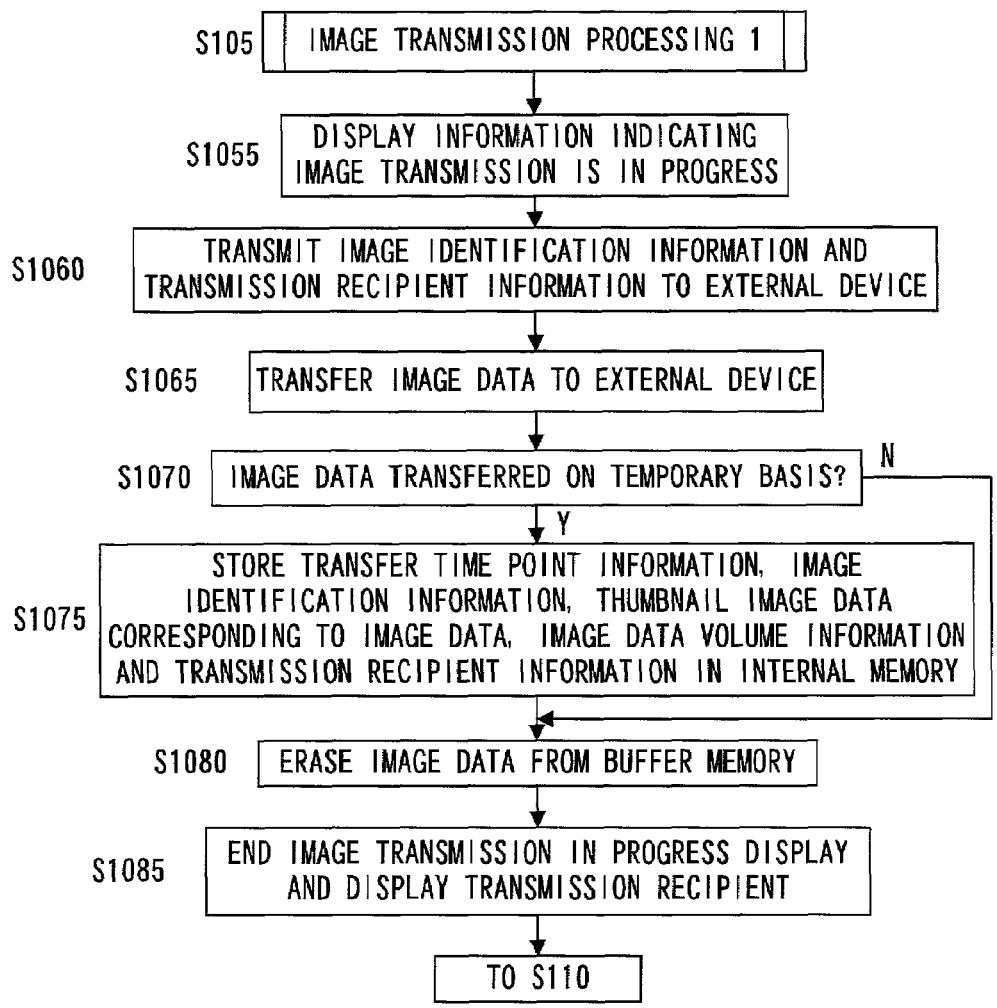
FIG. 12 presents a flowchart of the image transmission processing 1.

In S90, the communication mode processing shown in FIG. 11 is executed to indicate that the communication mode has been selected and to set the continuous shooting mode for the electronic camera, before the operation proceeds to S95. In S95, a decision is made as to whether or not a shutter release instruction has been issued through an operation of the shutter release button, and if it is decided that a shutter release instruction has been issued, the operation proceeds to S100, whereas if it is decided that a shutter release instruction has not been issued, the operation proceeds to S110. In S100, the image capture and image display processing shown in FIG. 8 is executed to perform an image-capturing operation at the image sensor, an A/D conversion operation on the image signal at the A/D converter, a storage operation for storing the image data into the buffer memory and a display operation for displaying the image data at the display unit, before the operation proceeds to S105. In S105, the image transmission processing 1 shown in FIG. 12 is executed to wirelessly to transmit the image data stored at the buffer memory to the external device, before the operation proceeds to S110.

In S110, the image capture and image display processing shown in FIG. 8 is executed to perform an image-capturing operation at the image sensor, an A/D conversion operation on the image signal at the A/D converter, a storage operation for storing the image data into the buffer memory and a display operation for displaying the image data at the display unit, before the operation proceeds to S115. In S115, a decision is made as to whether or not a power off instruction has been issued through an operation of the power switch, and if a power off instruction has been issued, the power control circuit is controlled in S120 to turn off the power to the electronic camera system, whereas if a power off instruction has not been issued, the operation returns to step S20. Since the system power off operation is performed after the image data are saved as described above, the image data are not lost even if the power switch is turned off while saving the image data.

Figure 4:
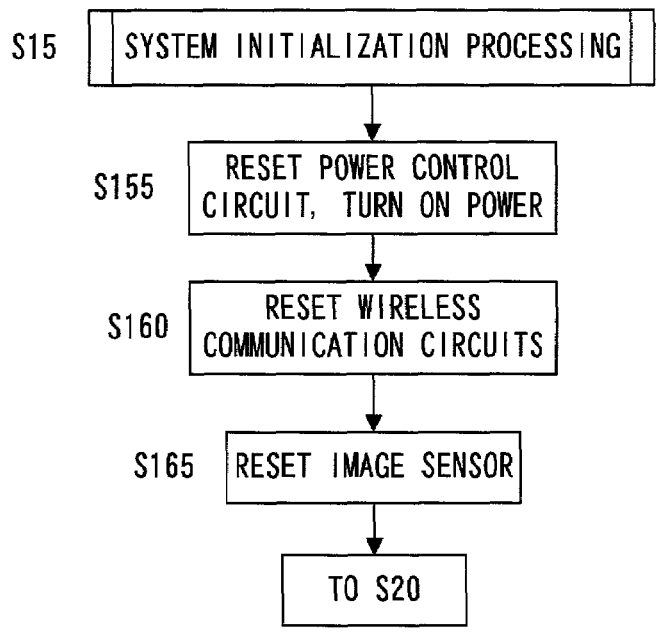
FIG. 4 presents a flowchart of the system initialization processing.

FIG. 4 presents a detailed flowchart of the system initialization processing. The power control circuit is reset in S155 to turn on the power to the electronic camera system. In S160, the wireless communication circuits are reset. In S165, the image sensor operation is reset, before the operation proceeds to S20.

FIG. 5 is a detailed flowchart of the processing executed to check the available storage capacity remaining in the memory card. In S305, the remaining capacity of the memory card is detected through communication with the memory card and the remaining storage capacity is displayed at the display unit. The remaining storage capacity may be indicated as a memory capacity (the number of bytes) or it may be indicated as a number of images that can be photographed. The remaining storage capacity thus displayed prompts the photographer to take appropriate action such as loading a new memory card as necessary, thereby preventing erroneous handling of the image data. In S310, a decision is made as to whether or not the remaining storage capacity is equal to or larger than the capacity for storing one image and if it is decided that the remaining storage capacity is equal to or larger than the capacity required for recording an image, the operation proceeds to S35. However, the operation proceeds to S75 otherwise.

FIG. 6 presents a detailed flowchart of the image reception processing. In S405, information indicating that there are image data having been transferred to an external device on a temporary basis is displayed at the display unit. The information thus displayed enables the photographer to select the image reception mode if necessary or to choose to continue with the photographing operation. In S410, a decision is made as to whether or not the image reception mode has been selected, and if the image reception mode is currently set, the operation proceeds to S415, whereas if the image reception mode is not currently set, the operation proceeds to S480. In S415, information indicating that the image reception mode has been selected is displayed at the display unit. In S420, a predetermined number of thumbnail images of the image data having been transferred to the external device on a temporary basis are displayed together at the display unit in chronological order (either in the order starting with the least recent image or the order starting with the most recent image) based upon transfer time point information. It is to be noted that if there are excess thumbnail images that cannot be displayed at the display unit, the display is updated when the processing in S420 is next executed.

It is to be noted that the thumbnail images of the image data having been transferred to the external device on a temporary basis have been prepared and stored in the internal memory at the time of the transfer. In addition, the transfer time point information indicating the time point at which the image data are transferred to the external device, image data volume information indicating the storage capacity required to save the transmitted image data, transmission recipient information with regard to the external memory, which is the recipient of the images, and image identification information (filenames) used to identify the image data, too, are stored in the internal memory in correspondence to the thumbnail image data.

In S425, a decision is made as to whether or not the photographer has selected an image from the plurality of thumbnail images on display through the setting button, and the operation proceeds to S430 if a thumbnail image has been selected. Other wise the operation proceeds to S475. In S430, the storage capacity required for saving the entire image data selected through the thumbnail image selection is calculated and a decision is made as to whether or not the required storage capacity is equal to or smaller than the available storage capacity remaining in the loaded memory card. If the required storage capacity is equal to or smaller than the available storage capacity, the operation proceeds to S440, whereas if the required storage capacity is larger than the available storage capacity, the operation proceeds to S435. In S435, a warning indicating that the available storage capacity remaining at the memory card is not sufficient to store all the selected images is displayed at the display unit and then the operation proceeds to S475. The warning thus displayed prompts the photographer to take appropriate action such as switching to a memory card with sufficient available storage capacity.

In S440, the transmission recipient information with respect to the recipient to which the selected image data were transmitted is read out from the internal memory, a wireless communication with the external device capable of accessing the external memory which is the recipient of the transmission is tried based upon the transmission recipient information, a decision is made as to whether or not the communication has been successfully established and the operation proceeds to S450 if the communication has been established, whereas the operation proceeds to S445 if communication has failed. In S445 to which the operation proceeds if communication has failed, a warning indicating that the image data cannot be recalled is displayed at the display unit, before the operation proceeds to S470.

In S450, the transmission recipient information and the image identification information are transmitted to the external device and also, a transfer request to transfer the image data is transmitted to the external device. In S455, the image data from the external memory are received via the external device and the image data thus received are temporarily stored in the buffer memory. Then, in S460, the image data stored in the buffer memory are transferred and stored into the memory card. In S465, the information regarding the image data that have been stored (the thumbnail image data, the transfer time point information, the image data volume information, and the transmission recipient information) is deleted from the internal memory. A decision is made as to whether or not the trial for communication with the external device to transfer all the selected images has been completed, and the operation proceeds to S475 if the trial has been completed. Otherwise the operation returns to S440. In S475, a decision is made as to whether or not the setting to end the image reception mode has been selected or whether or not all the images have been transmitted (i.e., whether or not there is no more image to be recalled), and if an affirmative decision is made, the operation proceeds to S480, whereas if a negative decision is made, the operation returns to S420. In S480, a message indicating that the image reception mode has ended is displayed at the display unit, and then the operation proceeds to S45.

FIG. 7 presents a detailed flowchart of the card mode processing. In S451, information indicating that the card mode is currently set is displayed at the display unit. In S452, the frame speed (the number of photographs that can be taken per second) Nm for a continuous photographing (continuous shooting) operation to be performed in the card mode is set in the electronic camera and the frame speed is displayed at the display unit, before the operation proceeds to S50. With the frame speed thus displayed, the photographer can ascertain the number of frames Nm over which photographs can be shot continuously in the card mode. It is to be noted that the number of frames Nm over which photographs can be continuously shot in the card mode and the number of frames Nc over which photographs can be continuously shot in the communication mode achieve a relationship expressed as Nm>Nc, since the transfer speed at which image data are transferred to an external device through wireless communication is lower than the transfer speed at which image data are transferred into the memory card.

FIG. 8 presents a detailed flowchart of the image display processing subroutine. In S555, the image sensor is engaged in an image-capturing operation and outputs an image signal. In S560, the image signal undergoes A/D conversion at the A/D converter to become image data, and the resulting image data are temporarily stored into the buffer memory in S565. In S570, the image constituted of the image data stored in the buffer memory is displayed at the display unit, and then in S575, the operation returns to the step in which the subroutine was called up.

FIG. 9 presents a detailed flowchart of the image memory card storage processing 1. In S605, the image data stored in the buffer memory are transferred to the memory card, and then the operation proceeds to S110.

FIG. 10 presents a detailed flowchart of the communication enabled check processing 1. In S801, a wireless communication is attempted by the wireless communication circuit for short-distance communication. In S802, a decision is made as to whether or not communication has been successfully established, and if the communication has been established, the operation proceeds to S803, whereas if the communication has failed, the operation proceeds to S807. In S803, information indicating the available storage capacity remaining in the external memory connected to the external device with which the communication is in progress is requested, and the information regarding the remaining storage capacity is received in S804. In S805, a decision is made as to whether or not the remaining storage capacity is equal to or larger than a data volume corresponding to one image, and the operation proceeds to S806 if the remaining storage capacity is equal to or larger than the data volume corresponding to one image. Otherwise, the operation proceeds to S807. In S806, this communication partner is set as the recipient to which the image data are to be transferred, and then the operation proceeds to S85.

In S807, a wireless communication is attempted by the wireless communication circuit for long-distance communication. In S808, a decision is made as to whether or not the communication has been successfully established, and if the communication has been established, the operation proceeds to S809, whereas if the communication has failed, the operation proceeds to S90. In S809, information indicating the available storage capacity remaining in the external memory connected to the external device with which the communication is in progress is requested, and the information regarding the available storage capacity is received in S810. In S811, a decision is made as to whether or not the remaining storage capacity is equal to or larger than a data volume corresponding to one image, and the operation proceeds to S812 if the storage available capacity is equal to or larger than the data volume corresponding to one image. Otherwise, the operation proceeds to S90. In S812, this communication partner is set as the recipient to which the image data are to be transferred, and then the operation proceeds to S85.

The communication with the short-distance wireless communication circuit is first attempted as described above, since less power is required to transfer the image data through a short-distance wireless communication thereby achieving an advantage of saving power in the electronic camera which uses a battery or the like for the power source and saving the cost of long-distance wireless communication which includes the fee for using the communication line.

FIG. 11 presents a detailed flowchart of the communication mode processing. In S905, information indicating that the communication mode is currently set is displayed at the display unit. In S910, the frame speed (the number of photographs that can be taken per second) Nc (<Nm) for a continuous photographing (continuous shooting) operation to be performed in the card mode is set in the electronic camera and the frame speed is displayed at the display unit before the operation proceeds to S95. The frame speed thus displayed enables the photographer to take appropriate action. For instance, if the number of frames Nc over which photographs can be taken continuously is not sufficient, the number of frames for continuous shooting can be raised by switching to the memory mode. It is to be noted that the number of frames Nc over which photographs can be taken continuously in the communication mode may be changed in correspondence to the communication speed at which the communication is wirelessly performed with the communication partner. In such a case, even when transferring image data to a communication partner with a low communication speed, a timing conflict of image data obtained through continuous photographing operation in the buffer memory can be avoided to achieve a reliable continuous shooting operation.

FIG. 12 is a detailed flowchart of the image transmission processing 1. In S1055, information indicating that image transmission is in progress is displayed at the display unit. In S1060, the image identification information such as the filename or the like of the image data and the transmission recipient information with which the external memory where the image data are stored is identified are transmitted to the external device selected as the destination to which the image data are to be transferred. In S1065, the image data are transferred to the external device. The image data transferred to the external device are then transmitted and stored in the external memory specified by the transmission recipient information from the external device. In S1070, a decision is made as to whether or not the transferred image data have been transferred to the external device on a temporary basis, and if they have been transferred on a temporary basis, the operation proceeds to S1075, whereas if the image data have been transferred on a permanent basis, the operation proceeds to S1080. In S1075, the transfer time point information indicating the time point at which the image data were transferred, the thumbnail image data corresponding to the image data, the image identification information such as the image filename or the like, the image data volume information indicating the capacity required to store the image data and the transmission recipient information are stored into the internal memory as information related to the same image data. In S1080, the image data, the transfer of which has been completed, are erased from the buffer memory. In S1085, the display of the information indicating that the image transmission is in progress is cleared and instead, the data on the image transmission recipient are displayed, before the operation proceeds to S110.

It is to be noted that the recipient of the image data may be set by the photographer through the setting button or the image data may be transmitted to a recipient stored in memory as a default setting in the electronic camera. Alternatively, an available external memory may be automatically selected by the external device to which the image data have been transferred. In this case, the transmission recipient information is sent back from the external device side to the electronic camera.

In the operation program executed by the system control CPU 1 as explained in reference to FIGS. 3 through 12 above, image data are transferred to the external device through wireless communication if the memory card is substantially unusable in the card mode, the image data are then stored in an external memory connected to the external device, the image data stored in the external memory connected to the an external device are automatically received through wireless communication when the memory card becomes available for use and the image data are thus saved into the memory card.

Next, in the operation program executed by the system control CPU 1, as shown in the flowcharts in FIGS. 13 through 16, image data are temporarily saved in the memory card if an external memory is substantially unusable in the communication mode, the image data are automatically read out from the memory card when the external memory becomes available for use, the image data are then transferred to the external device through wireless communication and the image data are thus saved into the external memory connected to the external device.

Figure 13:
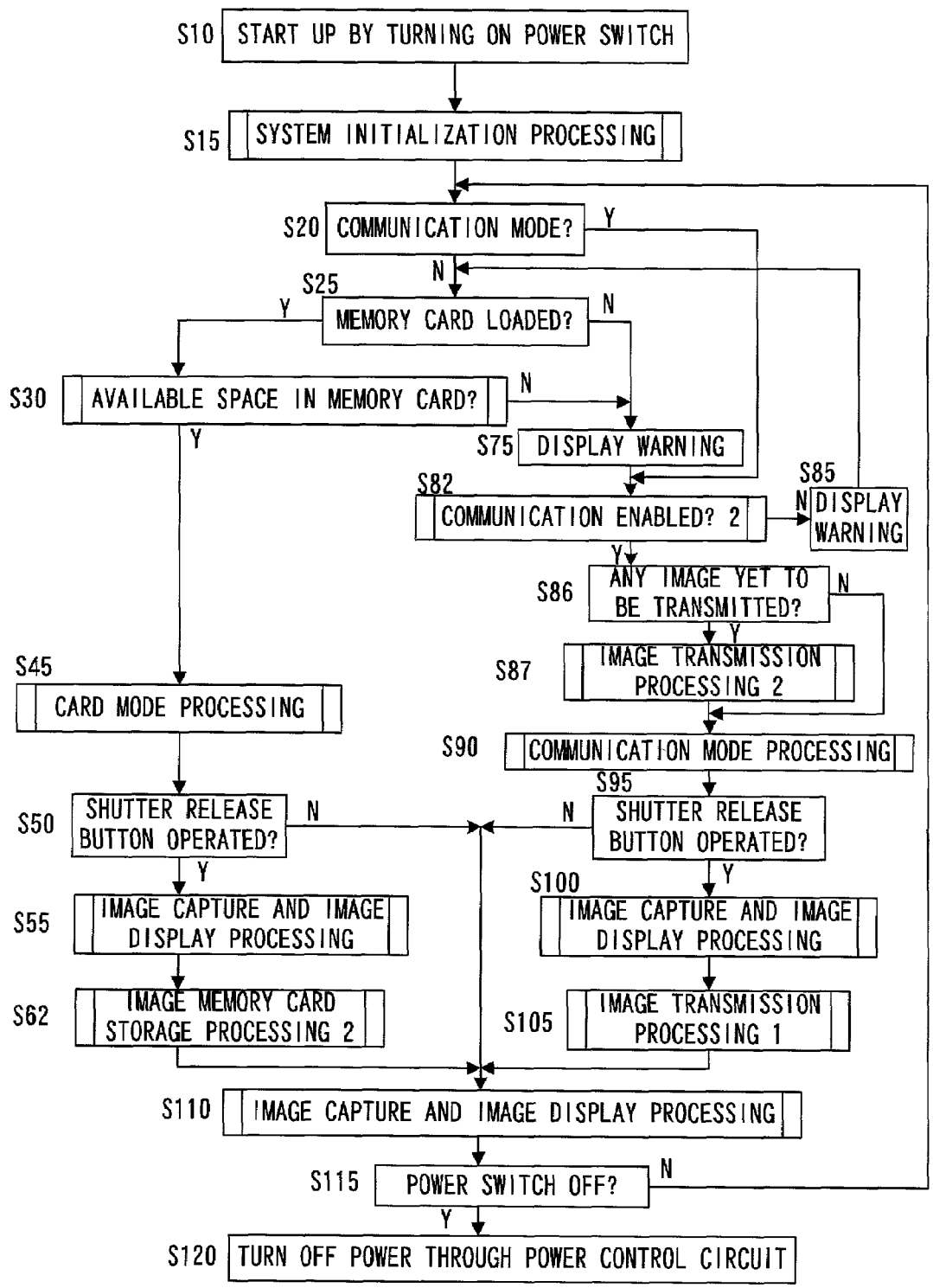
FIG. 13 presents a flowchart of the main operation processing 2.

FIG. 13 shows the main program executed by the system control CPU 1, with the same step numbers assigned to steps in which an operation identical to that in FIG. 3 is executed. In FIG. 13, the operation of the system control CPU 1 starts from S10 as the power switch is turned on. In S15, the electronic camera system initialization processing in FIG. 4 is executed. In S20, the current storage mode setting is checked to determine whether or not the communication mode is selected, and if it is ascertained that the communication mode is currently selected, the operation proceeds to S80, whereas if it is ascertained that the card mode is currently selected, the operation proceeds to S25. In S25, a decision is made as to whether or not a memory card is loaded at the slot, and if a memory card is loaded, the operation proceeds to S30, whereas if no memory card is loaded, the operation proceeds to S75. The presence/absence of a memory card may be detected through a mechanical switch or it may be electrically detected through communication or the like with the memory card.

In S30, the available storage capacity remaining at the memory card is checked as shown in FIG. 5, and if it is decided that there is sufficient storage capacity remaining at the memory card, the operation proceeds to S45, whereas if it is decided that there is not sufficient storage capacity, the operation proceeds to S75. In S45, the card mode processing shown in FIG. 7 is executed to indicate that the card mode is currently set on display and to set the continuous shooting mode for the electronic camera, before the operation proceeds to S50.

In S50, a decision is made as to whether or not a shutter release instruction has been issued through an operation of the shutter release button, and the operation proceeds to S55 if a shutter release instruction has been issued, whereas the operation proceeds to S110 if a shutter release instruction has not been issued. In S55, the image capture and image display processing shown in FIG. 8 is executed to perform an image capturing operation at the image sensor, an A/D conversion operation on the image signal at the A/D converter, a storage operation for storing the image data into the buffer memory and a display operation for displaying the image data at the display unit, before the operation proceeds to S62. In S62, the image memory card storage processing 2 shown in FIG. 14 is executed to store the image data stored at the buffer memory into the memory card loaded at the slot, before the operation proceeds to S110.

Figure 15:
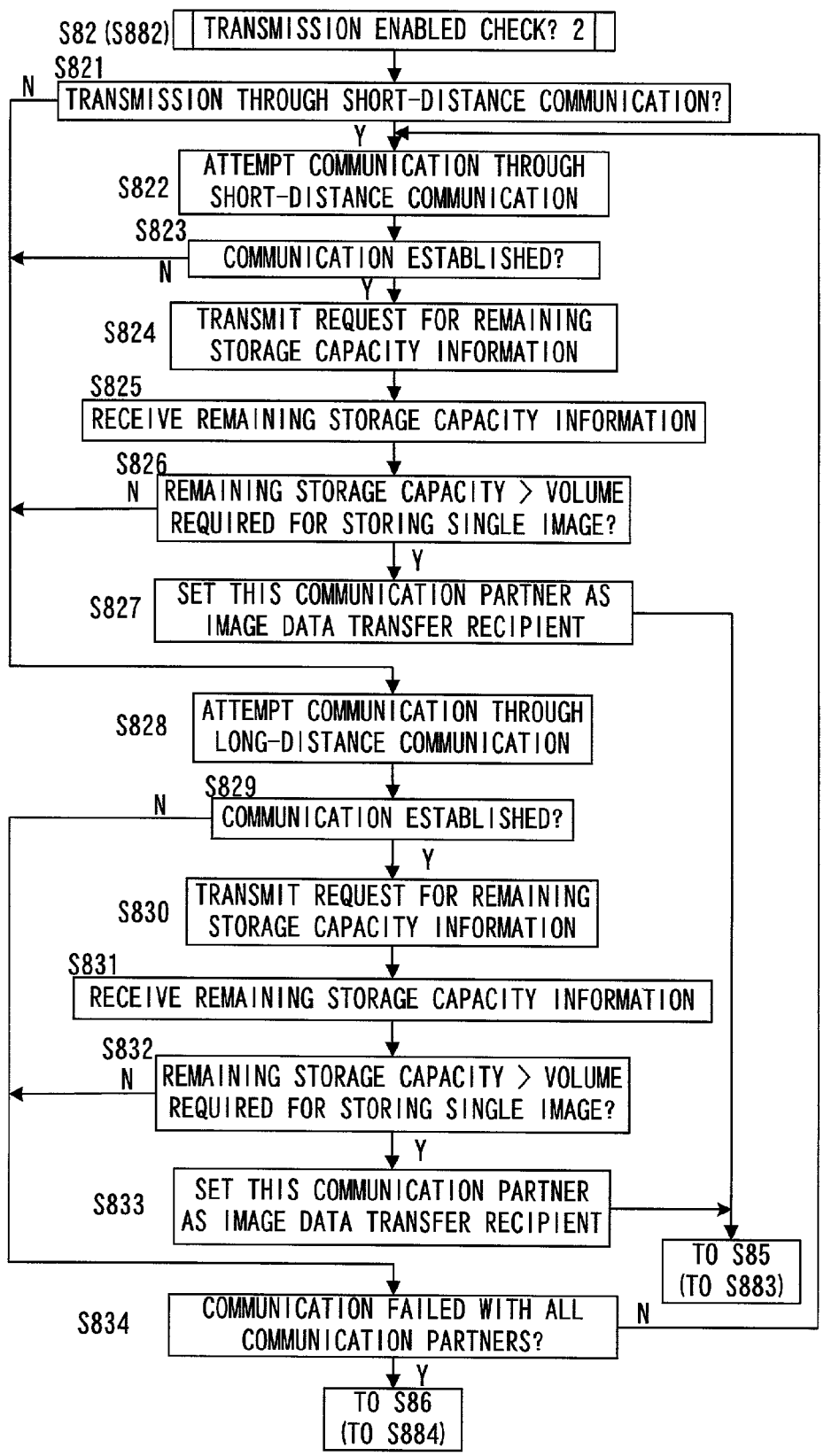
FIG. 15 presents a flowchart of the communication enabled check processing 2.

In S75, a warning indicating that no memory card is loaded at the slot or that the storage capacity remaining at the loaded memory card is not sufficient, although the card mode is selected, is displayed at the display unit, before the operation proceeds to S82. The warning thus displayed prompts the photographer to take appropriate action such as loading a new memory card thereby preventing erroneous handling of the image data. In S82, the communication enabled check processing 2 shown in FIG. 15 is executed to make a decision as to whether or not wireless communication with an external device is enabled, and if the communication is enabled, the operation proceeds to S86, whereas if the communication is disabled, the operation proceeds to S85. In S85, a message indicating that communication with an external device is disabled is displayed at the display unit, before the operation returns to step S25. The warning thus displayed prompts the photographer to take appropriate action such as selecting the card mode for the storage mode, thereby preventing erroneous handling of the image data.

Figure 16:
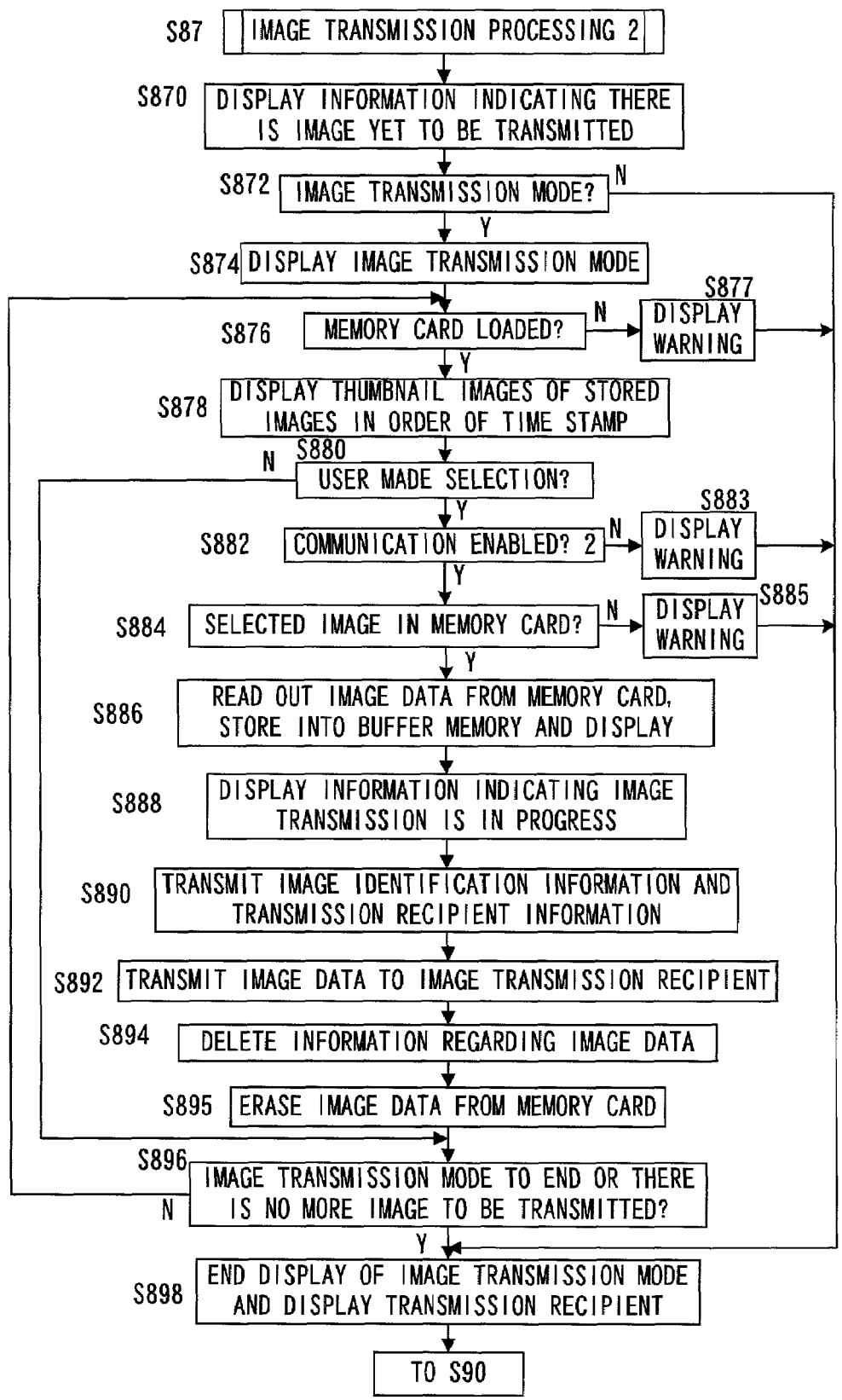
FIG. 16 presents a flowchart of the image transmission processing 2.

In S86, a decision is made as to whether or not there is any image having been transferred into the memory card on a temporary basis that has not yet been transferred to the external device, and the operation proceeds to S87 if there is such an image. Otherwise, the operation proceeds to S90. It is to be noted that the decision as to whether or not there is any image having been transferred to the memory card on a temporary basis that has not yet been transferred to the external device may be made by checking whether or not the internal memory holds any information on image data having been transferred to the memory card. In S87, the image transmission processing 2 in FIG. 16 is executed to read out the image data stored in the memory card on a temporary basis, store the image data thus read out into the buffer memory and transmit and save the image data stored in the buffer memory into a external memory connected to the external device through wireless communication before the operation proceeds to S90.

In S90, the communication mode processing shown in FIG. 11 is executed to indicate that the communication mode has been selected and to set the continuous shooting mode for the electronic camera, before the operation proceeds to S95. In S95, a decision is made as to whether or not a shutter release instruction has been issued through an operation of the shutter release button, and if it is decided that a shutter release instruction has been issued, the operation proceeds to S100, whereas if it is decided that a shutter release instruction has not been issued, the operation proceeds to S110. In S100, the image capture and image display processing shown in FIG. 8 is executed to perform an image-capturing operation at the image sensor, an A/D conversion operation on the image signal at the A/D converter, a storage operation for storing the image data into the buffer memory and a display operation for displaying the image data at the display unit, before the operation proceeds to S105. In S105, the image transmission processing 1 shown in FIG. 12 is executed to wirelessly transmit the image data stored at the buffer memory to the external device, before the operation proceeds to S110.

In S110, the image capture and image display processing shown in FIG. 8 is executed to perform an image-capturing operation at the image sensor, an A/D conversion operation on the image signal at the A/D converter, a storage operation for storing the image data into the buffer memory and a display operation for displaying the image data at the display unit, before the operation proceeds to S115. In S115, a decision is made as to whether or not a power off instruction has been issued through an operation of the power switch, and if a power off instruction has been issued, the power control circuit is controlled in S120 to turn off the power to the electronic camera system, whereas if a power off instruction has not been issued, the operation returns to step S20.

FIG. 14 presents a detailed flowchart of the image memory card storage processing 2. In S625, the image data stored in the buffer memory are transferred to the memory card. In S630, a decision is made as to whether or not the transferred image data have been transferred into the memory card on a temporary basis, and the operation proceeds to S635 if the image data have been transferred on a temporary basis whereas the operation proceeds to S110 if the image data have been transferred on a permanent basis. In S635, the transfer time point information indicating the time point at which the image data were transferred, the thumbnail image data of the image data, the image identification information including the image filename, the image data volume information with regard to the image data and the card identification information to be used to identify the memory card are stored in the internal memory as information related to the same image data, and then the operation proceeds to S110.

FIG. 15 presents a detailed flowchart of the communication enabled check processing 2. In S821, a decision is made as to whether the recipient of the image data is an external memory connected to the external device with which short-distance communication is conducted or an external memory connected to the external device with which long-distance communication is conducted and if the recipient of the image data is the external memory connected to the external device with which short-distance communication is conducted, the operation proceeds to S822, whereas if the recipient is the external memory connected to the external device with which long-distance communication is conducted, the operation proceeds to S828. In S822, a wireless communication is attempted by the wireless communication circuit for short-distance communication. In S823, a decision is made as to whether or not communication has been successfully established, and if the communication has been established, the operation proceeds to S824, whereas if the communication has failed, the operation proceeds to S828. In S824, information indicating the available storage capacity remaining in the external memory connected to the external device with which the communication is in progress is requested, and the information regarding the remaining storage capacity is received in S825. In S826, a decision is made as to whether or not the remaining storage capacity is equal to or larger than a data volume corresponding to one image, and the operation proceeds to S827 if the remaining storage capacity is equal to the data volume corresponding to one image. Otherwise, the operation proceeds to S828. In S827, this communication partner is set as the recipient to which the image data are to be transferred, and then the operation proceeds to S85 (or S883).

In S828, a wireless communication is attempted by the wireless communication circuit for long-distance communication. In S829, a decision is made as to whether or not communication has been successfully established, and if the communication has been established, the operation proceeds to S830, whereas if the communication has failed, the operation proceeds to S834. In S830, information indicating the available storage capacity remaining in the external memory connected to the external device with which the communication is in progress is requested, and the information regarding the available storage capacity is received in S831. In S832, a decision is made as to whether or not the remaining storage capacity is equal to or larger than a data volume corresponding to one image, and the operation proceeds to S833 if the remaining capacity is equal to or larger than the data volume corresponding to one image. Otherwise, the operation proceeds to S834. In S833, this communication partner is set as the recipient to which the image data are to be transferred, and then the operation proceeds to S85(or S883).

In S834, a decision is made as to whether or not the attempt to wirelessly communicate with all the potential communication partners through the wireless communication circuits for both short-distance communication and long-distance communication has failed, and if the communication has not been established, the operation proceeds to S86 (or S884), whereas if there is still a communication partner with which communication may be established, the operation returns to step S822.

FIG. 16 presents a detailed flowchart of the image transmission processing 2. First, in S870, information indicating that there is an image that has not yet been transmitted is displayed. This display enables the photographer to set the image reception mode as necessary or to choose to continue with the photographing operation. In S872, a decision is made as to whether or not the image transmission mode has been selected, and the operation proceeds to S874 if the image transmission mode is currently set, whereas the operation proceeds to S898 if the image transmission mode has not been selected. In S874, information indicating that the operation has entered the image transmission mode is displayed at the display unit. In S876, a decision is made as to whether or not a memory card having saved therein the image data that have not been transmitted is loaded, and the operation proceeds to S878 if such a memory card is loaded, whereas the operation proceeds to S877 if no such memory card is loaded. In S877, a warning indicating that the memory card having saved therein image data that have not been transmitted is not loaded is displayed, before the operation proceeds to S898. Thus, the photographer is prompted to take appropriate action such as loading a memory card having saved therein image data that have not been transmitted.

In S878, a predetermined number of thumbnail images of the image data saved in the memory card on a temporary basis are displayed together at the display unit in chronological order (in the order starting with the least recent thumbnail image or in the order starting with the most recent thumbnail image) based upon the transfer time point information. It is to be noted that if there are any excess thumbnail images that cannot be displayed at the display unit, the display is updated when the processing in S878 is next executed.

It is to be noted that the thumbnail images of the image data saved in the memory card on a temporary basis are prepared and stored in the internal memory in advance when the image data are saved into the memory card. In addition, the transfer time point information indicating the time point at which the image data are transferred into the memory card, the image volume information indicating the storage capacity required to save the transferred image data, the card identification information used when identifying the memory card in which the images are saved and the image identification information (filename) used to identify the image data, too, are stored in the internal memory in correspondence to the thumbnail image data.

In S880, a decision is made as to whether or not an image has been selected by the photographer by operating the setting button from the plurality of thumbnail images on display, and the operation proceeds to S882 if a thumbnail image has been selected, whereas the operation proceeds to S896 if no thumbnail image has been selected. In S882, the communication enabled check processing 2 shown in FIG. 15 is executed to make a decision as to whether or not it is possible wirelessly communicate with an external device, and if such a communication is enabled, the operation proceeds to S84, whereas if the communication is disabled, the operation proceeds to S883. In S883, a message indicating that the communication with an external device is disabled is displayed at the display unit before the operation proceeds to S898.

In S884, a decision is made as to whether or not the image data corresponding to the selected thumbnail image are saved in the loaded memory card, and the operation proceeds to S886 if the image data are saved in the memory card, whereas the operation proceeds to S885 if the image data are not saved in the memory card. In S885, information indicating that the selected image data are not saved in the loaded memory card is displayed at the display unit and then the operation proceeds to S898.

In S886, the image data are read out from the memory card, stored in the buffer memory and displayed at the display unit. In S888, a message indicating that an image transmission is in progress is displayed. In S890, the image identification information such as the filename of the image data and the transmission recipient information to be used for specifying the external memory where the image data are to be stored are transmitted to the external device set as the transfer destination. In S892, the image data are transferred to the external device. The image data transferred to the external device are further transmitted and stored into the external memory specified with the transmission recipient information from the external device. In S894, the information (thumbnail image data, the transfer time point information, the image data volume information and the card identification information) with regard to the image data, the transmission of which to the external memory has been completed, is deleted from the internal memory. In S895, the image data, the transmission of which has been completed, are erased from the memory card. In S896, a decision is made as to whether or not a setting to end an image transmission mode has been selected or whether or not there is no more image to be transmitted (i.e., whether or not there is no more image to be recalled from the memory card), and the operation proceeds to S898 if an affirmative decision is made whereas the operation returns to S876 if a negative decision is made. In S898, information indicating that the operation has exited the image transmission mode is displayed at the display unit and then the operation proceeds to S90.

(Variations)

The present invention is not limited to the example presented in the embodiment explained above, and allows for a number of variations and modifications.

While thumbnail images are displayed and a desired image is selected by the photographer when image data having been saved on a temporary basis are to be stored into the originally intended storage destination in the embodiment explained above, all the image data having been saved on a temporary basis may be automatically saved into the originally intended storage destination, instead. In such a case, it is not necessary to store thumbnail image data, and thus, the internal memory is not required to have a large storage capacity and, at the same time, since the photographer does not need to select an image, he is allowed to focus on good photo opportunities that may arise.

In addition, while the embodiment includes the wireless communication circuits for both short-distance communication and long-distance communication, it is not absolutely necessary for the image-capturing device to have the two wireless communication circuits and it may be provided with either one of them.

While image data originally intended to be saved into an external memory are temporarily saved into the memory card if a wireless communication with the external devices cannot be established in the embodiment described above, the image data may be saved into an internal memory with a large storage capacity provided in the electronic camera, instead.

Furthermore, when saving image data into a specified recipient external memory through a wireless communication, the image data are temporarily saved into the memory card if the specified external memory is not available in the embodiment. However, the image data may be saved into an another external memory on a temporary basis and then saved into an the specified external memory from the external memory where they are saved on a temporary basis when the specified external memory becomes available for use, instead. Such an operation may be enabled by transmitting a command from the electronic camera to the external device to save the image data into the specified external memory from the external memory where the image data have been saved on a temporary basis as the specified external memory becomes available when saving the image data on a temporary basis. As a result, the transfer of the image data between the external memories can be implemented without involving the electronic camera at all, which allows the photographer to concentrate on the photographing operation.

In addition, while the electronic camera is internally provided with the wireless communication circuits in the embodiment described above, a card-type wireless communication circuit that can be detachably mounted at the memory card slot for loading a memory card may be utilized, instead. In such a case, the electronic camera, which normally stores image data into the memory card loaded at the memory card slot, is switched to the communication mode for automatically transmitting the image data into an external memory when the CPU detects that a card-type wireless communication circuit is loaded in the memory card slot of the electronic camera. Since this ensures that the camera operation is automatically switched to the communication mode as soon as a card-type wireless communication circuit is loaded into the slot, the need to manually reset the recipient to which the image data are to be stored and the like is eliminated, thereby enabling the photographer to take photographs without missing a good photo opportunity.

While the operation is manually switched to the communication mode in the embodiment explained above, the operation may be automatically switched to the communication mode by detecting that the available storage capacity remaining in the loaded memory card has become insufficient.

Furthermore, while the continuous shooting frame speed during a continuous photographing operation is lowered in the communication mode in the embodiment described above, the continuous photographing operation itself may be disallowed in the communication mode, instead.

Moreover, while the photographer manually selects the card mode or the communication mode in the embodiment, the optimal mode may be selected by interlocking with other settings of the electronic camera. For instance, in a sports photographing mode selected for a camera photographing operation suited to photograph sporting activities, the likelihood of the photographer performing continuous shooting is high and thus, the card mode in which image data can be saved promptly may be automatically selected, whereas in a landscape mode for a camera photographing operation suited for photographing landscapes, the likelihood of the photographer performing continuous shooting is low and thus, the communication mode may be automatically selected. Alternatively, the card mode may be selected in conjunction with a high resolution recording mode in which a larger capacity is required to store image data, whereas the communication mode may be selected in conjunction with a high compression recording mode in which the capacity required for storing the image data is relatively small. As a further alternative, the card mode may be selected in conjunction with a high-speed continuous shooting mode and the communication mode may be selected in conjunction with an image data low-speed continuous shooting mode, in correspondence to the frame speed setting selected for a continuous shooting operation.

While image data are saved into the memory card on a temporary basis if no external memory is available for use, the image data are read out from the memory card when an external memory becomes available for use and the image data are saved into the external memory through wireless communication in the embodiment described above, the image data may be continuously held in the memory card or in the internal memory even when an external memory is in a usable state, to be read out from the memory card or the internal memory and saved into the external memory through wireless communication when the photographing sequence is completed, instead. For instance, during a continuous photographing operation, the image data resulting from the continuous photographing operation may be saved into the memory card or the internal memory on a temporary basis to be read out from the memory card or the internal memory and saved into the external memory through wireless communication when the continuous photographing operation is completed. In this case, a high-speed continuous shooting operation is enabled even when the communication mode is currently set.

In addition, while an explanation is given in reference to the embodiment on an example in which the portable memory is constituted of the memory card 10, the present invention is not limited to this example and the portable memory may be constituted of any storage device including a memory stick. Namely, the portable memory may be realized in any form of storage device as long as it can be detachably mounted in the electronic camera and achieves the convenience of mobility. Furthermore, the memory element may be a nonvolatile memory such as a flash memory or a semiconductor memory backed up by a battery. Namely, it may be any storage element that does not allow the memory contents to become lost when it is disengaged from the electronic camera.

While an explanation is given above in reference to the embodiment on an example in which the present invention is adopted in an electronic camera, the present invention is not limited to this example. For instance, the present invention may be adopted in conjunction with a mobile telephone, a PDA, a notebook type personal computer or a mobile personal computer, provided with a CCD camera or the like. Namely, the present invention may be adopted in all types of image-capturing devices that utilize a detachable portable memory.

Figure 17:
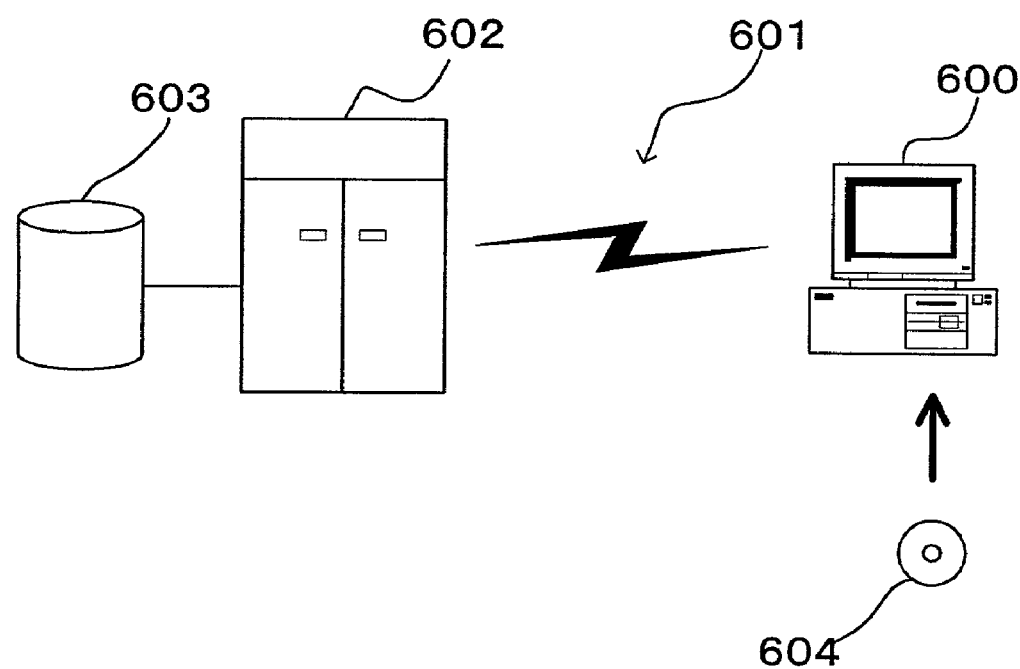
FIG. 17 is a block diagram showing the structure assumed in a system adopting the present invention.

It is to be noted that when the present invention is adopted in a computer such as a notebook type computer, the program explained earlier may be provided in a recording medium such as a CD-ROM or through data signals on the Internet or the like. FIG. 17 illustrates how this may be achieved. A computer 600 receives the program via a CD-ROM 604. The computer 600 can be connected with a communication line 601. A computer 602 is a server computer that provides the program which is stored in a recording medium such as a hard disk 603. The communication line 601 may be a communication line through which Internet communication or personal computer communication may be implemented or it may be a dedicated communication line. The computer 602 reads out the program from the hard disk 603 and then transmits the program to the computer 600 via the communication line 601. In other words, the program which is embodied as a data signal on a carrier wave is transmitted via the communication line 601. Thus, the program can be provided as a computer-readable computer program product in any of various modes such as a recording medium and a carrier wave.

What is claimed is:

1. An image-capturing device, comprising:
    an image sensor that captures a subject image and generates image data;
    an operation member that is operated by a user to cause the image sensor to capture a subject image and generate image data;
    a connection unit to which a detachable portable memory is connected;
    a setting unit that sets either the detachable portable memory or an external device as a storage device where the image data generated by the image sensor in response to operation of the operation member by the user is to be stored; and
    an image storage control unit that controls transfer of image data, to transfer the image data generated by the image sensor to the detachable portable memory in a case that the detachable portable memory is set as the storage device, to transfer the image data generated by the image sensor from the image-capturing device to the external device via a communication circuit capable of communicating with the external device to store the image data in the external device in a case that the external device is set as the storage device, and when communication with the external device is disabled in the case that the external device is set as the storage device, to transfer the image data generated by the image sensor to the detachable portable memory on a temporary basis so that the operation member can be operated to cause the image sensor to capture a next subject image,
    and to record image identification information with regard to the image data transferred to the detachable portable memory on a temporary basis so that the image data transferred to the detachable portable memory on a temporary basis and the image data transferred to the detachable portable memory in the case that the detachable portable memory is set as the storage device can be distinguished from each other.

2. An image-capturing device according to claim 1, wherein:
    the image storage control unit detects whether or not wireless communication with the external device is enabled and transfers the image data generated by the image sensor to the detachable portable memory if the wireless communication with the external device is detected to be disabled.

3. An image-capturing device according to claim 1, wherein:
    the image storage control unit detects whether or not a storage capacity of the external device is sufficient and transfers the image data generated by the image sensor to the detachable portable memory if the storage capacity of the external device is detected to be insufficient.

4. An image-capturing device according to claim 1, wherein:
the image storage control unit does not store image data which has been transferred to the external device in the detachable portable memory.

5. An image-capturing device according to claim 1, wherein the communication circuit is a wireless communication circuit capable of communicating with the external device through a wireless communication.

6. An image-capturing device according to claim 1, wherein the detachable portable memory is a memory card.

7. An image-capturing device according to claim 1, wherein
the image storage control unit further controls transfer of image data to transfer the image data stored in the detachable portable memory on a temporary basis to the external device when the external device becomes usable, in the case that the external device is set as the storage device.

8. An image-capturing device according to claim 7, wherein:
the image storage control unit deletes the recorded image identification information after the image data has been transferred to the external device.

9. An image-capturing device according to claim 1, wherein either the detachable portable memory or a wireless communication circuit capable of wirelessly communicating with the external device is electrically, detachably, selectively and exclusively connected to the connection unit,
wherein there is further provided a detection unit that detects whether or not the wireless communication circuit is connected to the connection unit,
wherein the setting unit automatically sets the external device as the storage device when the detection unit detects that the wireless communication circuit is connected to the connection unit, and
wherein the image storage control unit controls transfer of image data to wirelessly transfer the image data generated by the image sensor to the external device via the wireless communication circuit in the case that the external device is set as the storage device.

10. An image-captunng device according to claim 8, wherein in the case that the detachable portable memory is set as the storage device, the image storage control unit controls transfer of image data to transfer the image data generated by the image sensor to the detachable portable memory to store the image data in the detachable portable memory, and to transfer the image data generated by the image sensor to the external device when the detachable portable memory is not usable.

11. An image-capturing device according to claim 1, wherein:
the communication circuit is capable of communicating with the external device by at least a first wireless communication method and a second wireless communication method, and attempts the second wireless communication method when communication with the external device is failed by the first wireless communication method.

12. An image-capturing device according to claim 1, further comprising:
an internal memory, wherein:
the image storage control unit records the image identification information with regard to the image data transferred to the detachable portable memory on a temporary basis and memory identification to identify the detachable portable memory, into the internal memory in correspondence to each other.

13. An electronic camera, comprising:
an image sensor that captures a subject image and generates image data;
an operation member that is operated by a user to cause the image sensor to capture a subject image and generate image data;
a connection unit to which a detachable portable memory is connected;
a setting unit that sets either the detachable portable memory or an external device as a storage device where the image data generated by the image sensor in response to operation of the operation member by the user is to be stored; and
an image storage control unit that controls transfer of image data, to transfer the image data generated by the image sensor to the detachable portable memory in a case that the detachable portable memory is set as the storage device, to transfer the image data generated by the image sensor from the electronic camera to the external device via a wireless communication circuit to store the image data in the external device in a case that the external device is set as the storage device, and when communication with the external device is disabled in the case that the external device is set as the storage device, to transfer the image data generated by the image sensor to the detachable portable memory on a temporary basis so that the operation member can be operated to cause the image sensor to capture a next subject image,
and to record image identification information with regard to the image data transferred to the detachable portable memory on a temporary basis so that the image data transferred to the detachable portable memory on a temporary basis and the image data transferred to the detachable portable memory in the case that the detachable portable memory is set as the storage device can be distinguished from each other.

14. An electronic camera according to claim 13, further comprising:
an internal memory, wherein:
the image storage control unit records the image identification information with regard to the image data transferred to the detachable portable memory on a temporary basis and memory identification information to identify the detachable portable memory, into the internal memory in correspondence to each other.

15. An image-capturing device, comprising:
an image sensor that captures a subject image and generates image data;
an operation member that is operated by a user to cause the image sensor to capture a subject image and generate image data;
a memory; and
an image storage control unit that controls transfer of image data, and is operable in a communication mode, to automatically transfer the image data generated by the image sensor in response to operation of the operation member by the user from the image capturing device to an external device via a communication circuit capable of communicating with the external device to store the image data in the external device, and when communication with the external device is disabled, to transfer the image data generated by the image sensor to the memory so that the operation member can be operated to cause the image sensor to capture a next subject image, wherein the communication circuit is capable of communicating with the external device by at least a first wireless communication method and a second wireless communication method, and attempts the second wireless communication method when communication with the external device is failed by the first wireless communication method.

16. An image-capturing device, comprising:

an image sensor that captures a subject image and generates image data;

an operation member that is operated by a user to cause the image sensor to capture a subject image and generate image data; and an image storage control unit that controls transfer of image data, and is operable in a communication mode, to automatically transfer the image data generated by the image sensor in response to operation of the operation member by the user from the image capturing device to a first external device via a communication circuit capable of communicating with the first external device to store the image data in the first external device, and when communication with the first external device is disabled, to transfer the image data generated by the image sensor to a second external device via the communication circuit capable of communicating with the second external device to store the image data in the second external device so that the operation member can be operated to cause the image sensor to capture a next subject image, wherein;

an image storage control unit transmits a command from the image-capturing device to the second external device to transfer the image data to the first external device from the second external device where the image data have been stored on a temporary basis without involving the image-capturing device in case that the first external device has become available, when transferring the image data to the second external device.

17. An image-capturing device according to claim 16, wherein:

the image storage control unit communicates with the first external device by a first wireless communication method and communicates with the second external device by a second wireless communication method.

* * * * *